US012415957B2

(12) United States Patent
Gordon et al.

(10) Patent No.: US 12,415,957 B2
(45) Date of Patent: Sep. 16, 2025

(54) MOBILE BIOMASS THERMOCHEMICAL ENERGY CONVERSION UNIT AND RELATED METHODS

(71) Applicant: Locoal Charcoal Company, Del Valle, TX (US)

(72) Inventors: Garrett Gordon, Washougal, WA (US); Miles Murray, Boerne, TX (US); Matthew R. Peterson, Del Valle, TX (US); Joshua S. Rasey, Battle Ground, WA (US)

(73) Assignee: Locoal Charcoal Company, Del Valle, TX (US)

( * ) Notice: Subject to any disclaimer, the term of this patent is extended or adjusted under 35 U.S.C. 154(b) by 249 days.

(21) Appl. No.: 17/952,908

(22) Filed: Sep. 26, 2022

(65) Prior Publication Data

US 2023/0101536 A1    Mar. 30, 2023

Related U.S. Application Data

(60) Provisional application No. 63/248,692, filed on Sep. 27, 2021.

(51) Int. Cl.
    *C10B 53/02*    (2006.01)
    *C10L 9/08*    (2006.01)

(52) U.S. Cl.
    CPC .............. *C10B 53/02* (2013.01); *C10L 9/083* (2013.01); *C10J 2300/0916* (2013.01);
    (Continued)

(58) Field of Classification Search
    CPC ...... Y02E 50/10; C10L 9/083; C10L 2290/02; C10J 2300/0916; C10J 2300/0946;
    (Continued)

(56) References Cited

U.S. PATENT DOCUMENTS

| | | |
|---|---|---|
| 11,186,779 B2 | 11/2021 | Capareda et al. |
| 2012/0043194 A1 | 2/2012 | Lepez et al. |
| 2016/0144351 A1* | 5/2016 | Boldor ..................... B01J 23/40 |
| | | 201/2.5 |

FOREIGN PATENT DOCUMENTS

| | | |
|---|---|---|
| CN | 111944546 A | 11/2020 |
| CZ | 33325 U1 | 10/2019 |

(Continued)

OTHER PUBLICATIONS

Henkel, Charles Edward. *A Study of Induction Pyrolysis of Lignicellulosic Biomass for the Production of Bio-Oil*. Louisiana State University and Agricultural & Mechanical College, 2014.
(Continued)

*Primary Examiner* — Vishal V Vasisth
(74) *Attorney, Agent, or Firm* — Frost Brown Todd LLP

(57) ABSTRACT

A thermochemical energy conversion unit includes a heat expansion assembly including a reactor configured to receive a biomass and convert the biomass into a burnable gas having undesirable materials therein and a biochar. The heat expansion assembly also includes a heat expansion discharge pipe configured to discharge the burnable gas from the heat expansion assembly. The thermochemical energy conversion unit also includes a gas scrubber assembly operatively connected to the heat expansion assembly and configured to receive the burnable gas therefrom and to remove the undesirable materials from the burnable gas. The gas scrubber assembly includes a scrubber discharge pipe configured to discharge the burnable gas from the gas scrubber assembly. The heat expansion assembly and the gas scrubber assembly are configured to be continuously fluidly connected from the heat expansion discharge pipe to the scrubber discharge pipe for generating a continuous flow of the burnable gas therealong.

20 Claims, 14 Drawing Sheets

(52) U.S. Cl.
CPC ............... *C10J 2300/0946* (2013.01); *C10J 2300/0956* (2013.01); *C10L 2290/02* (2013.01)

(58) Field of Classification Search
CPC .. C10J 2300/0956; C10B 19/00; C10B 57/02; C10B 7/10; C10B 53/02; C10K 1/101; C10K 1/06; C10K 1/08
See application file for complete search history.

(56) References Cited

FOREIGN PATENT DOCUMENTS

| EP | 3209938 B1 | 1/2021 |
|----|------------|--------|
| EP | 3998326 A1 | 5/2022 |
| KR | 2021-0154503 A | 12/2021 |

OTHER PUBLICATIONS

International Search Report and Written Opinion dated Jan. 23, 2023, for International Application No. PCT/US2022/044726, 16 pages.

\* cited by examiner

MOBILE BIOMASS THERMOCHEMICAL ENERGY CONVERSION UNIT AND RELATED METHODS

CROSS-REFERENCE TO RELATED APPLICATION

This application claims priority to U.S. Pat. App. No. 63/248,692, entitled "Mobile Biomass Gasification Unit and Related Methods," filed Sep. 27, 2021, the disclosure of which is incorporated by reference herein.

BACKGROUND

While conventional energy production has traditionally met the demands of people throughout the world, increased scrutiny on such production has generated a growing interest and greater need for renewable and more sustainable energy solutions. Simultaneously, established economic models of the linear economy organized to take raw materials, make goods, and finally dispose of such goods as waste are being set aside in favor of more circular economies that recapture this waste as a resource for new goods and products. Significant opportunities thus exist at the intersection of energy production and waste recapture to reuse waste for conversion into energy.

Thermochemical energy conversion (e.g., biomass gasification, hydrothermal liquefaction, pyrolysis, torrefaction, combustion, etc.) offers one such solution to renewable and sustainable energy production that promotes a more circular economy. To this end, used biomass, essentially destined for a landfill, is redirected, collected, and fed to a thermochemical energy conversion unit (e.g., a gasifier), which converts the biomass by a thermochemical process (e.g., gasification) into syngas, heat, and biochar. The syngas and heat may be captured for energy, particularly the syngas, which may be used for power generation, such as in internal combustion engines. In addition, the biochar may be collected for use and sale as a commercial product.

Despite the apparent benefits of thermochemical energy conversion such as biomass gasification, gasifiers have long suffered from various technical challenges. For example, biomass gasification is most effective with relatively stable and relatively predictable conditions for thermochemical conversion within a reactor of the gasifier but feeding biomass into the reactor while discharging byproducts of the thermochemical conversion from the reactor to maintain such conditions constantly threaten the effectiveness and efficiency of the reaction. Moreover, these byproducts, such as the syngas and biochar, discharge with exceedingly hot temperatures taking both time to cool and creating increased risk to components as well as nearby operators. The pacing of feeding the biomass and discharging the byproducts is thus typically staggered in batches, resulting in downtime and often made worse by continued maintenance to address the deleterious operating condition of the gasifier. Increased size of such gasifiers may improve the size of batches and reliability of various components to some extent but result in increased cost and increased footprint of the gasifier.

There is thus a need for a thermochemical energy conversion unit such as a gasification unit and method of thermochemically converting biomass such as gasifying biomass, particularly for using waste biomass to generate heat, biochar, and syngas for powering an internal combustion engine, that addresses present challenges and characteristics such as those discussed above.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
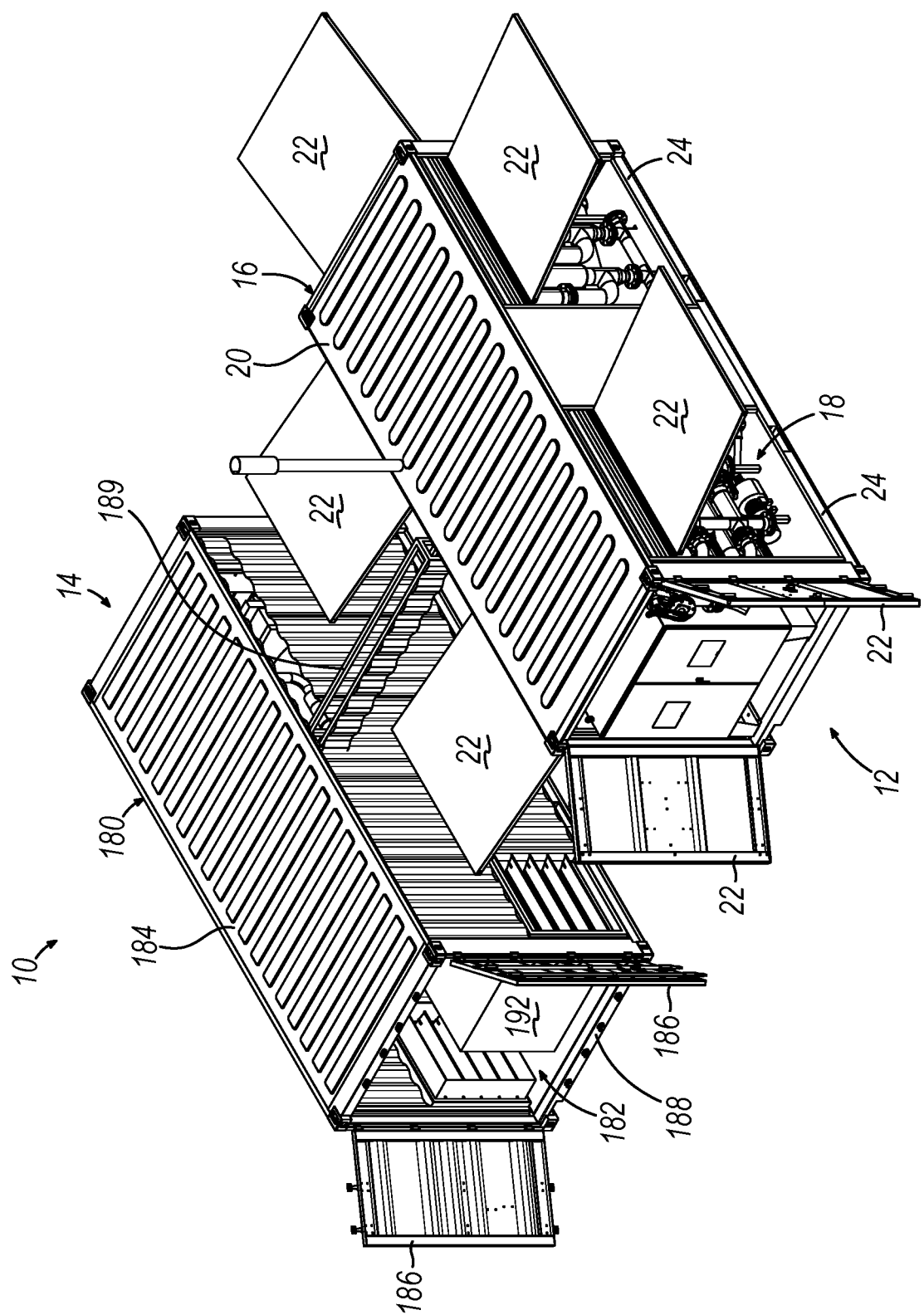
FIG. 1 depicts a front perspective view of a first exemplary power system with a thermochemical energy conversion assembly and a power generation assembly.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

To the extent that spatial terms such as "top," "bottom," "upper," "lower," "vertical," "horizontal," or the like are used herein with reference to the drawings, it will be appreciated that such terms are used for exemplary description purposes only and are not intended to be limiting or absolute. In that regard, it will be devices such as those disclosed herein may be used in a variety of orientations and positions not limited to those shown and described herein.

Furthermore, the terms "about," "approximately," and the like as used herein in connection with any numerical values or ranges of values are intended to encompass the exact value(s) referenced as well as a suitable tolerance that enables the referenced feature or combination of features to function for the intended purpose described herein.

I. First Exemplary Power System with Thermochemical Energy Conversion Assembly and Power Generation Assembly In some instances, it may be desirable to provide a power system (10) as shown in FIG. 1 including a thermochemical energy conversion assembly (12) operatively connected to a power generation assembly (14) for producing a burnable gas and biochar from a biomass, which in the present example is in an oxygen limited environment, for generating electrical power. By way of further example, power generation assembly (14) connects to thermochemical energy conversion assembly (12) to receive burnable gas therefrom for generating the electrical power. In one example, thermochemical energy conversion assembly (12) has a compact configuration suitable for intermodal transportation (e.g., via railcar, cargo ship, aircraft, truck, etc.) from a start location to an end location remote from the start location. Power generation assembly (14) may also have a compact configuration suitable for intermodal transportation from a start location to an end location remote from the start location, which may be the same as or different from the start and/or end location(s), respectively, of thermochemical energy conversion assembly (12). As used herein, the term "biomass" includes materials such as plants, wood, coal or other materials that contain carbon that are suitable for producing a burnable gas such as wood gas, syngas, or methane and is not intended to unnecessarily limit the invention described herein.

A. First Exemplary Thermochemical Energy Conversion Assembly

FIG. 1 shows thermochemical energy conversion assembly (12) including an intermodal transportation 20-foot shipping container, which is shown in the present example as a container (16), housing a thermochemical energy conversion unit (18). Container (16) comprises a housing (20) constructed of steel, aluminum, or plastic to provide a watertight enclosure that may be shipped in intermodal transportation by truck or ship. Housing (20) may have a length of about 20 ft (e.g., about 6.10 m), a width of about 8 ft (e.g., about 2.44 m), and/or a height of about 8.5 ft (e.g., about 2.59 m), for example.

Container (16) further comprises a plurality of doors (22) configured to allow access for servicing and operating thermochemical energy conversion unit (18) through openings (24) created when any one or more of the plurality of doors (22) is in an open position. The plurality of doors (22) may be transitioned between the closed position and the open position by a hydraulic system including a controller (not shown), a plurality of pipes (not shown), wiring (not shown), actuation vales (not shown), a reservoir (not shown) with a working fluid and a plurality of hydraulic cylinders (not shown). The controller (not shown) sends an electrical control signal via wiring (not shown) to actuate valves (not shown) that divert pressurized hydraulic fluid produced by a pump (not shown) from reservoir (not shown) to the plurality of hydraulic cylinders (not shown) operatively attached to each of the plurality of doors (22). Hydraulic cylinders (not shown) act upon the plurality of doors (22) to transition doors (22) from the closed position to the open position. In order to close the doors (22), controller (not shown) sends the electric control signal via wiring (not shown) to actuation valves (not shown) that divert or release pressurized fluid from hydraulic cylinders (not shown) and return the working fluid to reservoir. In some examples, doors (22) may be manually raised by an operator without hydraulic system (not shown) from the closed position to the open position and vice versa. Doors (22) may be placed in the closed position prior to thermochemical energy conversion assembly (12) being moved from its start location to its end location to securely house thermochemical energy conversion unit (18) within container (16), and may be placed in the open position after thermochemical energy conversion assembly (12) has reached its end location to facilitate operation of thermochemical energy conversion unit (18).

Figure 2:
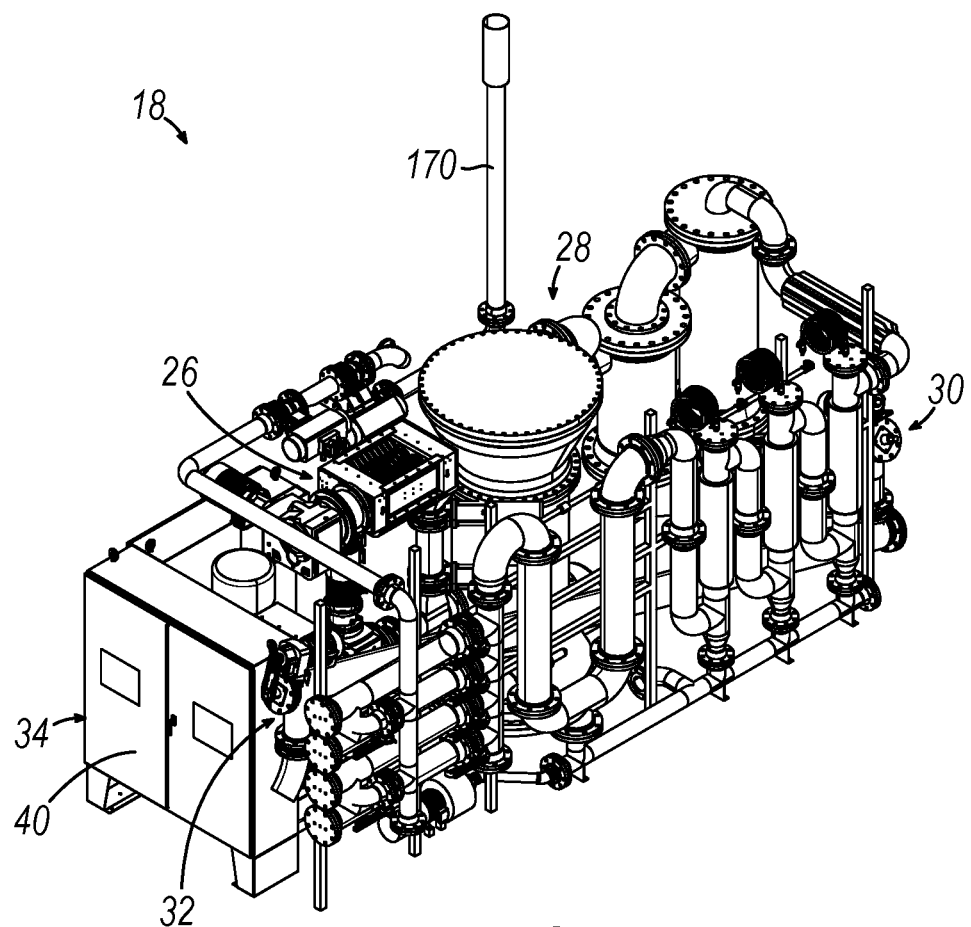
FIG. 2 depicts a front perspective view of a thermochemical energy conversion unit of the thermochemical energy conversion assembly of FIG. 1.

FIG. 2 shows thermochemical energy conversion unit (18) comprising a biomass feeding assembly (26), a heat expansion assembly (28), a gas scrubber assembly (30), a biochar extraction assembly (32), and a controller assembly (34). Controller assembly (34) controls and monitors portions of thermochemical energy conversion unit (18). Biomass feeding assembly (26) is configured to receive biomass from an assembly (not shown) configured to deliver solid biomass fuels, such as a conveyor, a piping, or a gravity fed hopper. Biomass feeding assembly (26) delivers this biomass to heat expansion assembly (28), where biomass is heated to a predetermined temperature to separate the burnable gasses from the carbon solids, which are in the form of biochar. Burnable gasses exit heat expansion assembly (28), and enter gas scrubber assembly (30), whereas biochar exits heat expansion assembly (28) and is delivered to biochar extraction assembly (32). Burnable gasses are conditioned to remove undesirable materials in gas scrubber assembly (30) and are directed towards a generator, such as power generation assembly (14) (see FIG. 1), boiler, or storage facility. As described in the present example, thermochemical energy conversion unit (18) may more particularly be described as a gasification unit (18) given that the particular thermochemical conversion being performed by heat expansion assembly (28) is gasification. By way of further example, a thermochemical energy conversion unit may also be described as a hydrothermal liquefaction unit, a pyrolysis unit, a torrefaction unit, or a combustion unit should heat expansion assembly be respectively performing hydrothermal liquefaction, pyrolysis, torrefaction, or combustion. Thermochemical energy conversion unit (18) is thus not intended to be unnecessarily limited to any one of gasification, hydrothermal liquefaction, pyrolysis, torrefaction, combustion, or any other particular thermochemical energy conversion. Indeed, in one example, thermochemical energy conversion unit (18) is configured for performing one or more processes of thermochemical energy conversion. Thermochemical energy conversion unit (18), which may also be referred to as gasification unit (18) below, is thus not intended to be limited to gasification.

With respect to FIGS. 1 and 2, controller assembly (34) of the present example includes a central processing unit (36), which may also be referred to as a CPU, and a memory (37) within a controller (38), a cabinet (40), a circuitry (42), a wiring (44), a plurality of input devices (46), a plurality of output devices (48), and other components to aid in controlling a fully actuated machine, including, but not limited to, gasification unit (18). Cabinet (40) houses central processing unit (36) and controller (38), input devices (46), and output devices (48). Central processing unit (36) is configured to receive electrical inputs via wiring from the plurality of input devices (46) including, but not limited to, temperature, pressure, humidity, thermocouples, photodetectors, level, and motion detectors. Central processing unit (36) makes decisions about the gasification process based on the inputs and provides outputs via controller (38) through wiring to actuate valves, electric motors, and actuators and other controls equipment such as those discussed herein to efficiently run the gasification process. The plurality of output devices (48) may further include gauges, indicator lights, or a smart display panel positioned within cabinet (40) so that the operator may monitor the gasification process and make real time adjustments to the process via an input device, such as a keypad (not shown) or a smart input display (not shown).

i. First Exemplary Biomass Feeding Assembly

Figure 3:
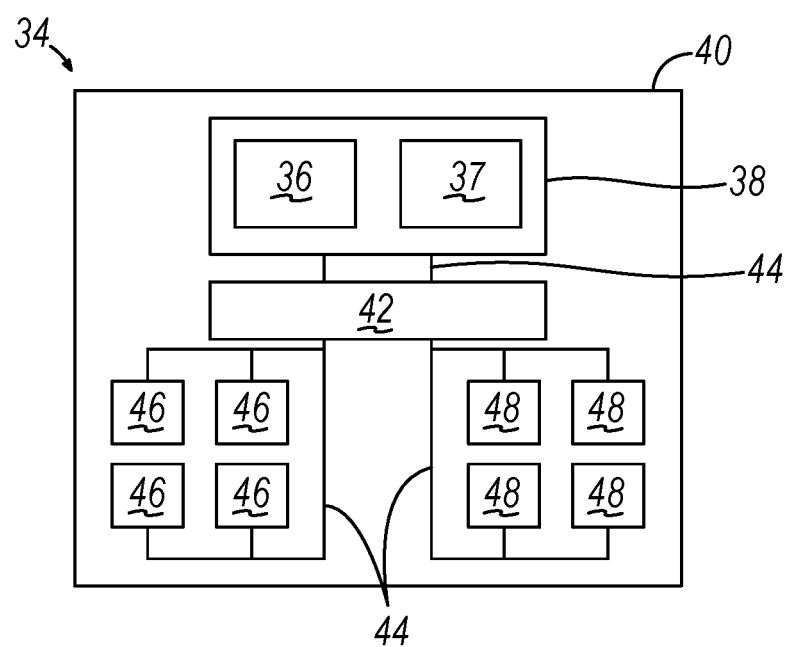
FIG. 3 depicts a schematic view of a controller assembly of the thermochemical energy conversion unit of FIG. 2.
Figure 4:
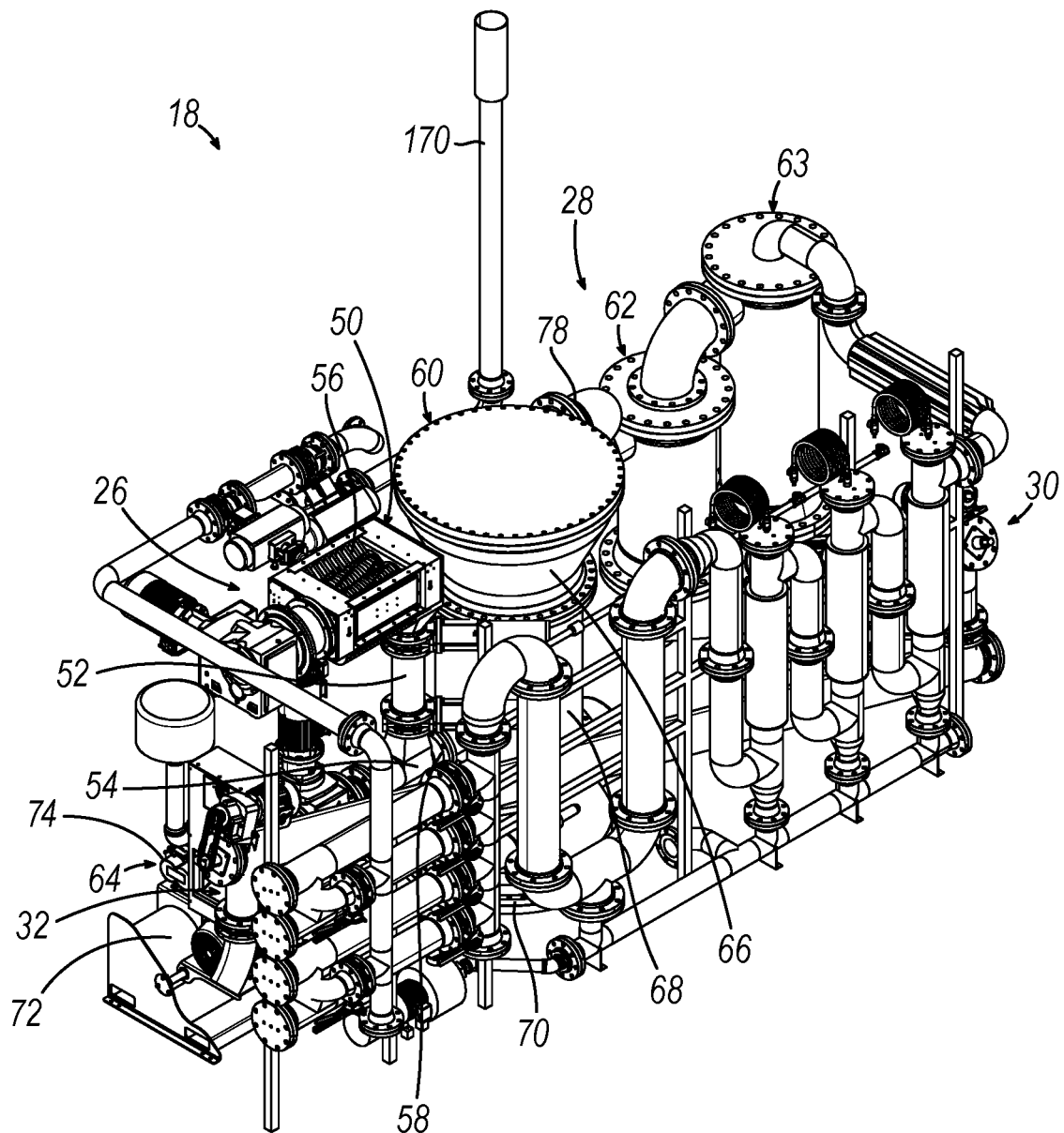
FIG. 4 depicts a front perspective view of the thermochemical energy conversion unit of FIG. 2 with the controller assembly omitted and at least partially showing a biomass feeding assembly, a heat expansion assembly, a gas scrubber assembly, and a biochar extraction assembly of the thermochemical energy conversion unit.
Figure 5:
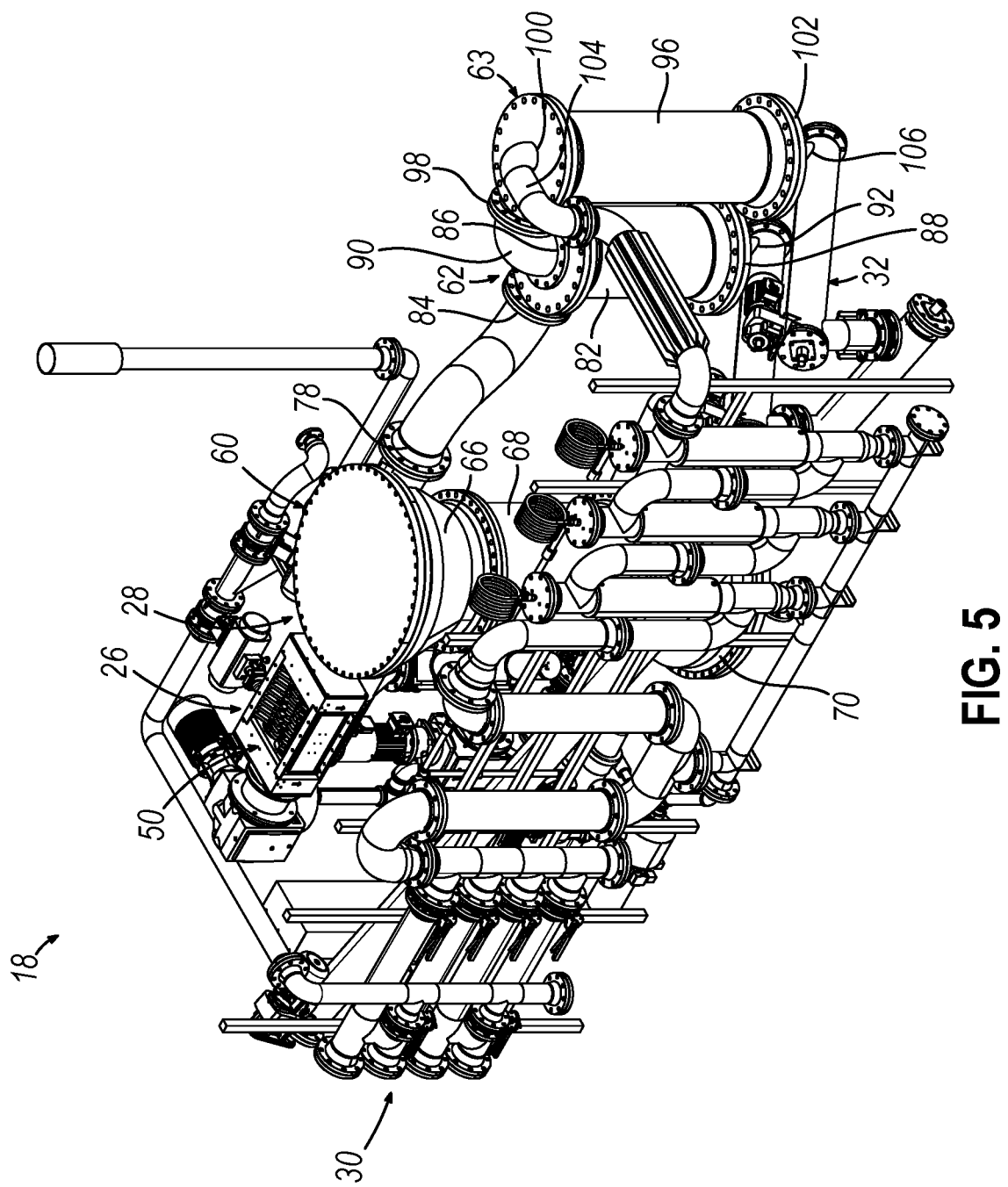
FIG. 5 depicts a rear perspective view of the thermochemical energy conversion unit of FIG. 2 at least partially showing the biomass feeding assembly, heat expansion assembly, gas scrubber assembly, and biochar extraction assembly of the thermochemical energy conversion unit.

FIGS. 4 and 5 show biomass feeding assembly (26) including a biomass input device (50), a housing (52), and a biomass transfer device (54). Biomass of the present example is moved through biomass input device (50) without changing or releasing the pressures within housing (52). In one example, biomass input device (50) includes a valve in the form of a rotary airlock (not shown) having a rotatable vane (not shown) that is driven by an electric motor (not shown) via a transmission (not shown). Rotatable vane (not shown) seals the ambient environment from an interior chamber (not shown) within housing (52), while allowing biomass to be moved from an inlet (56) into housing (52). Once biomass is within housing (52), the biomass falls by gravity to a bottom portion of housing (52). In one example, biomass transfer device (54) includes an electric motor (not shown), a transmission (not shown), and a plurality of augers (not shown). Controller (38) (see FIG. 3) sends electrical energy to electrical motor (not shown), turning transmission (not shown) in the form of belts and pullies to drive the plurality of augers (not shown). The plurality of augers (not shown) move biomass towards a distal end of housing (52) where the biomass is ejected by biomass transfer device (54) through a discharge pipe (58) towards heat expansion assembly (28).

In some versions, housing (52) may be equipped with a freefall mass metering sensor, such as a microwave sensor, configured to detect the mass of each particle of the biomass falling by gravity through housing (52). Such a sensor may be in operative communication with controller (38) to provide one or more signals to controller (38) indicative of the detected mass so that controller (38) may continuously monitor the mass of biomass being inputted to heat expansion assembly (28) and/or take action responsive thereto. For example, controller (38) may be configured to actuate the electric motor of the rotary airlock or other valve to drive the rotary airlock responsively to the monitored mass of biomass for providing a predetermined and/or continuous amount of biomass to heat expansion assembly (28).

While a valve in the form of a rotary airlock has been described, it will be appreciated that any suitable type and/or number of valve(s) may be used. For example, biomass input device (50) may include one or more knife gate valves in addition to or in lieu of the rotary airlock. In some cases, a first knife gate valve may be provided at or near a top end of housing (52) (e.g., above the freefall mass metering sensor) for regulating the movement of biomass from inlet (56) into housing (52), and a second knife gate valve may be provided at or near a bottom end of housing (52) (e.g., below the freefall mass metering sensor) for regulating the movement of biomass from housing (52) into biomass transfer device (54).

ii. First Exemplary Heat Expansion Assembly

In one example, heat expansion assembly (28) comprises a reactor (60), a plurality of separators (62, 63), and a blower assembly (64). Reactor (60) in one example includes a freeboard (66) located at a top portion of reactor (60), a main body (68) positioned in a middle portion of reactor (60), and a burner plenum (70) positioned at a bottom portion of reactor (60). Main body (68) has a cylindrically shaped body positioned between burner plenum (70) and freeboard (66). Biomass is received into main body (68) from discharge pipe (58) of biomass feeding assembly (26) that penetrates through a sidewall of main body (68). Biomass is heated within main body (68) to a predetermined temperature in a low oxygen environment separating the biomass into burnable gas and biochar. Burner plenum (70) has a frustoconical shape having a narrower portion and a wider portion. Narrower portion of burner plenum (70) is connected to the bottom portion of main body (68). Burner plenum (70) is supplied with fresh air through blower assembly (64). Blower assembly (64) includes an air moving device, such as an air pump (72), which is driven by an electric motor (74). When desirable, electric motor (74) is actuated to provide air to burner plenum (70) via a metering device (not shown) and two inlet pipes (not shown) located opposite each other that penetrate a sidewall of burner plenum (70). Once air reaches burner plenum (70), air passes upwards, and a positive pressure is created within main body (68). This positive pressure carries burnable gasses and biochar to freeboard (66) positioned above main body (68) into freeboard (66). Freeboard (66) has a frustoconical shape with a narrower portion and a wider portion. The narrower portion of freeboard (66) is connected to the top portion of main body (68). The positive pressure forces the burnable gasses and biochar out of a freeboard discharge pipe (78) towards the plurality of separators (62, 63).

Figure 6:
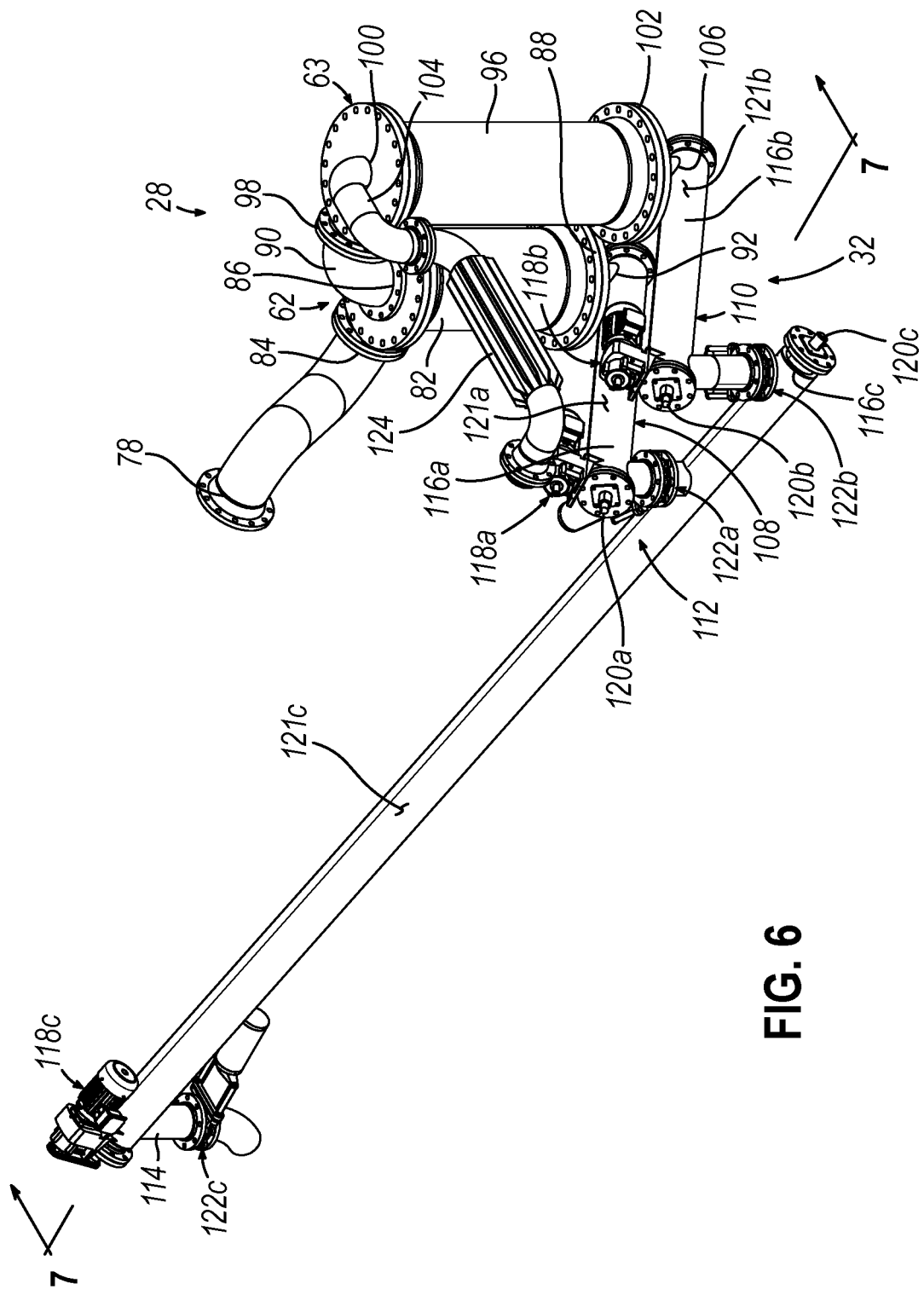
FIG. 6 depicts a rear perspective view of the biochar extraction assembly of the thermochemical energy conversion unit of FIG. 2.

The plurality of separators (62, 63) shown in FIGS. 5 and 6 includes a first separator (62) and a second separator (63), but may include any number of separators to separate the burnable gasses from the biochar. First separator (62) in one example is a cyclone separator (62), more specifically a 1D2D cyclone separator (62). First separator (62) in one example has a conical interior (not shown), a cylindrical exterior (82), a first inlet (84), a first gas discharge (86), and a first biochar discharge (88). Conical interior (now shown) includes a tapered conical surface extending from a narrow portion near a bottom of first separator (62) that extends upwards with a conical taper towards a wider portion near a top of first separator (62). Freeboard discharge pipe (78) connects to first inlet (84) and is offset from the wider portion so that the burnable gasses and biochar enter the wider portion and swirl about a centerline of first separator (62) with a cyclonic helical airflow. This cyclonic helical airflow applies centripetal force to encourage larger, denser biochar to fall out from the burnable gas biochar mixture allowing the gasses and smaller biochar particles to rise through first gas discharge (86) connected to a first gas discharge pipe (90) that extends towards second separator (63). The larger particles of biochar exit through first biochar discharge (88) operatively connected to a large particle discharge pipe (92) that extends towards biochar extraction assembly (32).

First gas discharge pipe (90) of first separator (62) extends to second separator (63). Second separator (63) is a cyclone separator, more specifically a 1D3D cyclone separator. Second separator (63) is configured to capture smaller particles of biochar than first separator (62). Second separator (63) has a conical interior (not shown), a cylindrical exterior (96), a second inlet (98), a second gas discharge (100), and a second biochar discharge (102). Conical interior (not shown) includes a tapered conical surface extending from a narrow portion near a bottom of second separator (63) that extends upwards with a conical taper towards a wider portion near a top of second separator (63). First gas discharge pipe (90) connects to second inlet (98) and is offset from wider portion so that the burnable gasses and biochar enter the wider portion and swirl about a centerline of second separator (63) with a cyclonic helical airflow. This cyclonic helical airflow allows the smaller particles of biochar not captured by first separator (62) to fall out from the mixture of burnable gasses and biochar and, in turn, the burnable gasses rise through second gas discharge (100) connected to a second gas discharge pipe (104) that extends towards gas scrubber assembly (30). The smaller particles of biochar exit through second biochar discharge (102) connected to a bottom portion of second separator (63), which connects to a small particle discharge pipe (106) that extends towards biochar extraction assembly (32).

iii. First Exemplary Biochar Extraction Assembly

Figure 7:
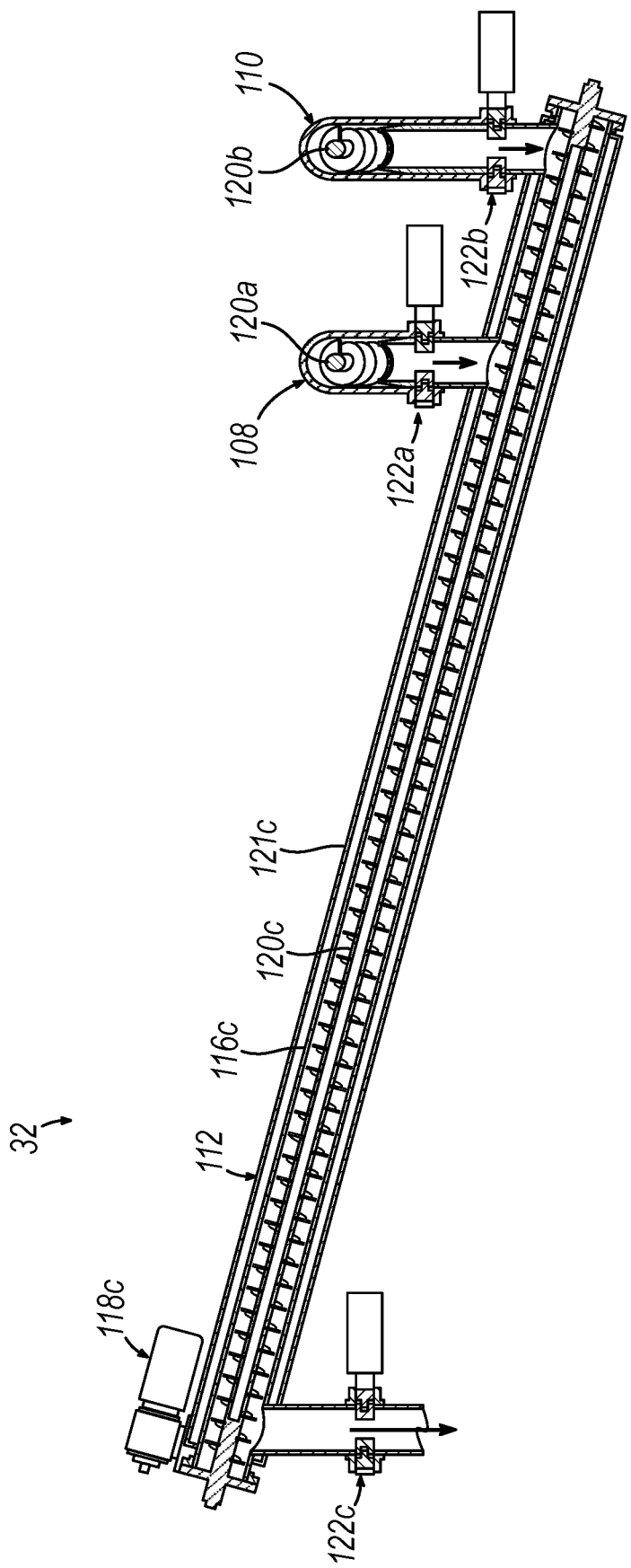
FIG. 7 depicts a cross-sectional view of the biochar extraction assembly of FIG. 6, taken along line 7-7 of FIG. 6.
Figure 8:
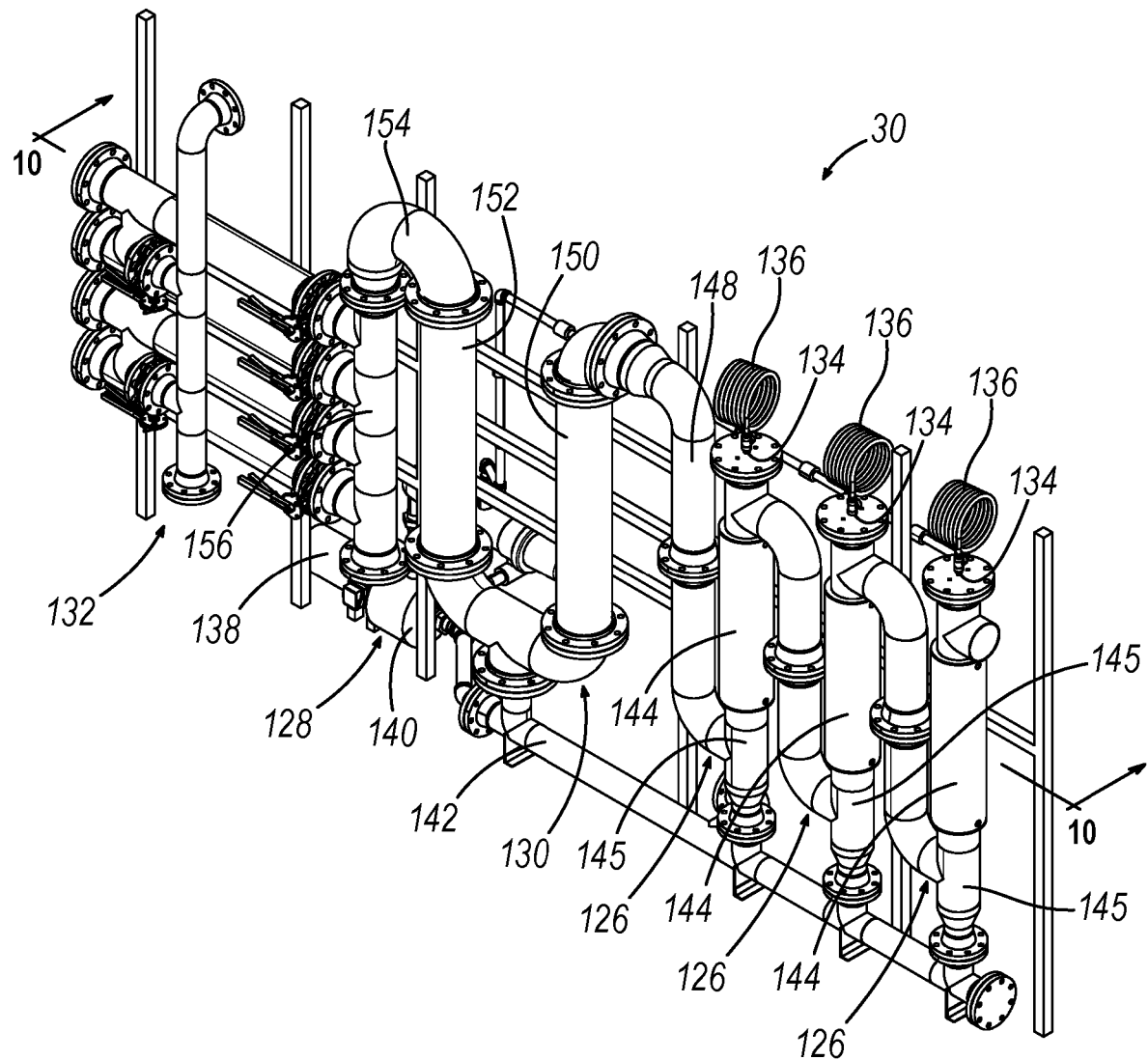
FIG. 8 depicts a rear perspective view of the gas scrubber assembly of the thermochemical energy conversion unit of FIG. 2.
Figure 9:
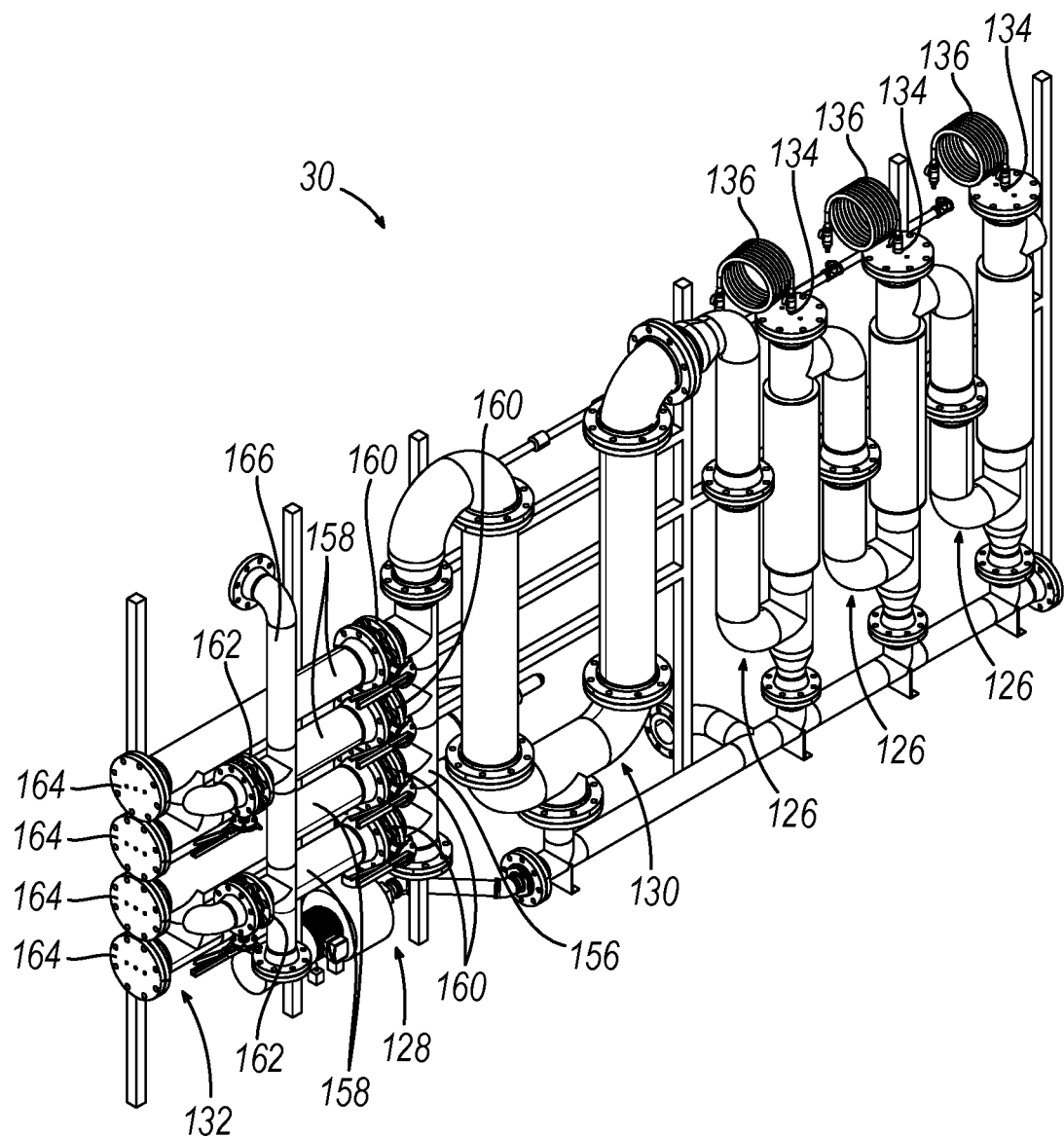
FIG. 9 depicts a front perspective view of the gas scrubber assembly of FIG. 8.

With respect to FIGS. 6 and 7, biochar extraction assembly (32) includes a large biochar auger assembly (108), small biochar auger assembly (110), a combined auger assembly (112), and a biochar discharge pipe (114). Large biochar auger assembly (108) includes a shell (116*a*), a drive assembly (118*a*), an auger (120*a*), and a cooling jacket (121*a*). Large biochar auger assembly (108) is configured to remove the large particles of biochar extracted from first separator (62). Large biochar auger assembly (108) is operatively connected to large particle discharge pipe (92) and extends in an angular upwards direction to combined auger assembly (112). Auger (120*a*) is positioned within shell (116*a*) and is driven by drive assembly (118*a*) positioned on an outside surface of shell (116*a*). Drive assembly (118*a*) spins auger (120*a*) to move biochar from large particle discharge pipe (92) to combined auger assembly (112). Cooling jacket (121*a*) is positioned around an exterior of shell (116*a*) and is supplied by a chill water system to supply glycol to cool the biochar as it is extracted from first separator (62). In the example shown, a valve in the form of a knife gate valve (122*a*) is positioned at or near an exit of large biochar auger assembly (108) for regulating the discharge of biochar to combined auger assembly (112).

Small biochar auger assembly (110) is constructed and configured similar to large biochar auger assembly (108). For example, small biochar auger assembly (110) includes a shell (116*b*), a drive assembly (118*b*), an auger (120*b*), and a cooling jacket (121*b*). Small biochar auger assembly (110) differs from large biochar auger assembly (108) mainly in that auger (120*b*) of small biochar auger assembly (110) is configured to remove smaller particles than large biochar auger assembly (108). Small biochar auger assembly (110) is operatively connected to small particle discharge pipe (106) and operatively connects to combined auger assembly (112). In the example shown, a valve in the form of a knife gate valve (122*b*) is positioned at or near an exit of small biochar auger assembly (110) for regulating the discharge of biochar to combined auger assembly (112).

Combined auger assembly (112) is similar in construction and configuration to large biochar auger assembly (108). For example, combined auger assembly (112) includes a shell (116*c*), a drive assembly (118*c*), an auger (120*c*), and a cooling jacket (121*c*). Auger (120*c*) of combined auger assembly (112) is configured to remove both small and large biochar. Cooling jacket (121*c*) is positioned around an exterior of shell (116*c*) and is supplied by a chill water system to supply glycol to cool the biochar as it is extracted from large and small biochar auger assemblies (108, 110). Combined auger assembly (112) extends in an angular manner the length of gasification unit (18) and discharges the combined biochar through biochar discharge pipe (114), from which the biochar has been reduced in temperature such that the biochar generally will not turn to ash upon being introduced into the surrounding environment and may be handled, such as moved to another site. In this regard, biochar discharge pipe (114) in one example may connect to an additional pipe or a biochar container for further storage and/or transport of the biochar. In the example shown, a valve in the form of a knife gate valve (122*c*) is positioned at or near a bottom end of biochar discharge pipe (114) for regulating the discharge of biochar from biochar discharge pipe (114).

iv. First Exemplary Gas Scrubber Assembly

FIGS. 6 and 8-10 show gas scrubber assembly (30). Gas scrubber assembly (30) comprises an inline heat exchanger (124), a plurality of venturi risers (126), a closed water distribution system (128), a shell and tube heat exchanger assembly (130), and a filter manifold (132). Second gas discharge pipe (104) extends through inline heat exchanger (124) to cool the burnable gas. The burnable gas then enters the plurality of venturi risers (126). The plurality of venturi risers (126) are arranged vertically and are arranged in series.

Closed water distribution system (128) of the present example includes a plurality of nozzles (134), a plurality of cooling coils (136), a pump (138), a reservoir (140), and a return manifold (142). Each nozzle (134) is located at a top portion of a respective venturi riser (126) and is configured to spray fluid, which in the present example is water, into the burnable gas passing through the respective venturi riser (126) in a corresponding conical spray pattern having a corresponding spray angle ($\alpha_1$, $\alpha_2$, $\alpha_3$) to remove undesirable materials from the burnable gas and fall out through a bottom portion of the respective venturi riser (126). In some versions, each nozzle (134) may be configured to spray the fluid in a unique conical spray pattern different from that of the other nozzles (134). For example, each nozzle (134) may be configured to spray the fluid at a corresponding spray angle ($\alpha_1$, $\alpha_2$, $\alpha_3$) different from those of the other nozzles (134). In some versions, the first (e.g., rightmost in the frame of reference of FIG. 10) nozzle (134) may have a first spray angle ($\alpha_1$) of about 15°; the second (e.g., middle in the frame of reference of FIG. 10) nozzle (134) may have a second spray angle ($\alpha_2$) of about 30°; and/or the third (e.g., leftmost in the frame of reference of FIG. 10) nozzle (134) may have a third spray angle ($\alpha_3$) of about 20°. The bottom portion of each venturi riser (126) is connected to return manifold (142) of water distribution system (128). Return manifold (142) is connected to reservoir (140), which is connected to pump (138) suppling pressurized water that passes through cooling coils (136) before reaching nozzles (134). Cooling coils (136) add additional cooling to the water before being delivered to nozzles (134).

Figure 10:
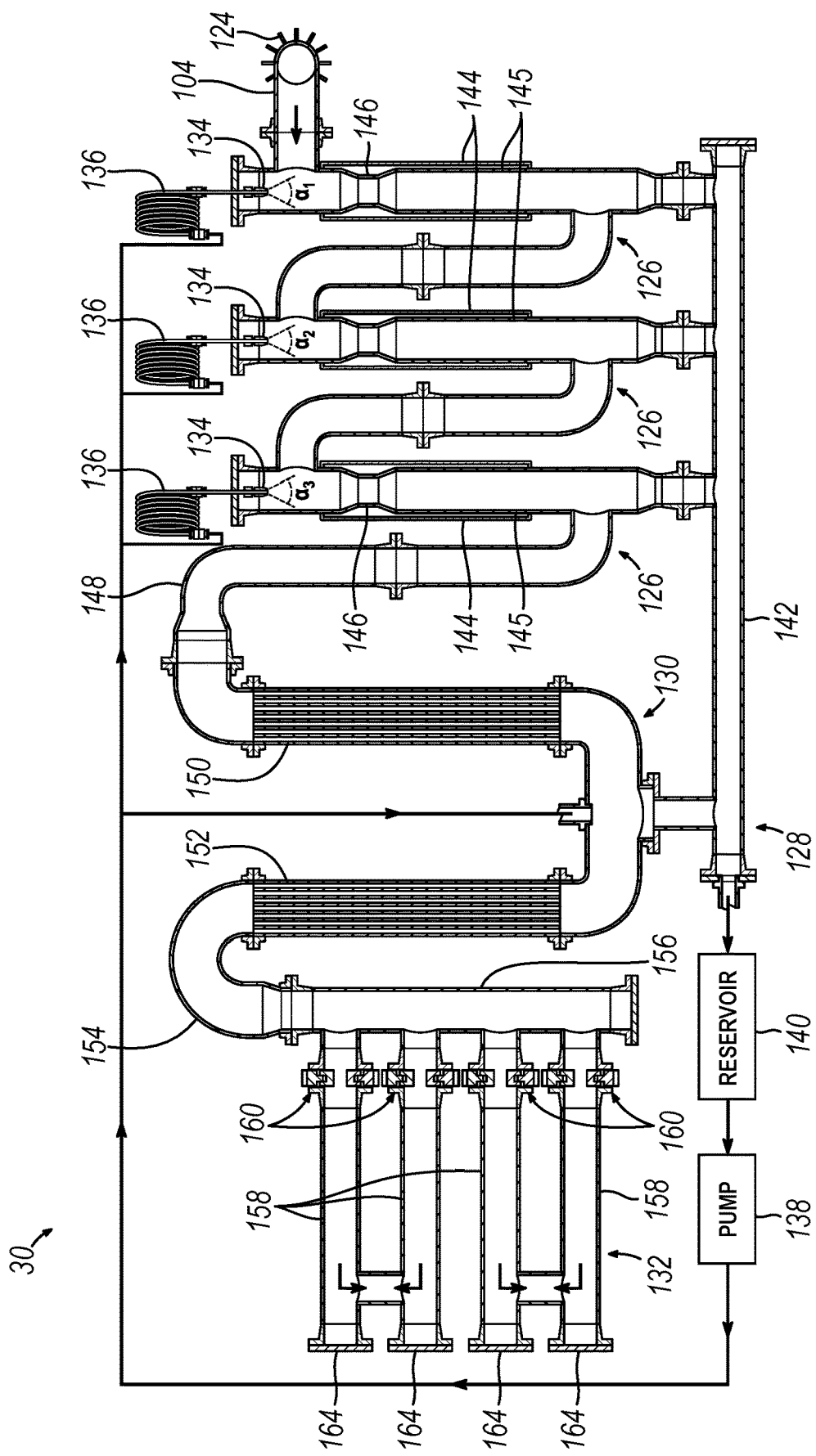
FIG. 10 depicts a cross-sectional view of the gas scrubber assembly of FIG. 8, taken along line 10-10 of FIG. 8.

Each venturi riser (126) includes an external cooling jacket (144), and a venturi (146) (see FIG. 10). In the present example, there are three venturi risers (126), however any number of venturi risers (126) may be used that provide an adequate pressure drop, remove undesirable materials, and cool the burnable gas. Venturi risers (126) each respectively increase the velocity of the burnable gas with a correspondingly decrease in pressure in accordance with the venturi effect. External cooling jacket (144) is located on an external shell (145) of each venturi riser (126) and is provided glycol to cool the burnable gases to create condensation further removing undesirable materials, which may be entrained with the water and drain out of the respective venturi risers (126) into return manifold (142). In some cases, some water may cling to and travel downwardly along an inner surface of the respective shell (145) via capillary action, and may drain out of the respective venturi risers (126) into return manifold (142).

After the burnable gas passes through the plurality of venturi risers (126) the burnable gas continues through a venturi discharge pipe (148) to shell and tube heat exchanger assembly (130). Shell and tube heat exchanger assembly (130) further cool the burnable gas and/or condense moisture entrained therein. In the present example, shell and tube heat exchanger assembly (130) includes a pair of shell and tube heat exchangers (150, 152) connected at a bottom portion to return manifold (142) that returns additional undesirable materials to reservoir (140) carried away by the condensation within shell and tube heat exchanger assembly (130). In some versions, the primary function of first shell and tube heat exchanger (150) may be to condense moisture entrained in the burnable gas (e.g., from venturi risers (126)), while the primary function of second shell and tube heat exchanger (152) may be to reduce the temperature of the burnable gas, though it will be appreciated that one or both shell and tube heat exchangers (150, 152) may perform either or both function(s). A shell and tube discharge pipe (154) extends from shell and tube heat exchanger assembly (130) and connects to a vertical manifold pipe (156). The burnable gas continues to flow through vertical manifold pipe (156) toward filter manifold (132).

As shown, vertical manifold pipe (156) connects to filter manifold (132) extending horizontally from vertical manifold pipe (156). Filter manifold (132) includes a plurality of filter pipes (158), a plurality of valves (160, 162), a plurality of cleanout flanges (164), and a plurality of carbon sock filters (not shown) disposed within filter pipes (158). Filter manifold (132) also has a plurality of intake valves (160) configured to isolate one or more corresponding filter pipe(s) (158) from vertical manifold pipe (156) and a plurality of discharge valves (162) configured to isolate one or more corresponding filter pipe(s) (158) from a filter discharge pipe (166). Intake and discharge valves (160, 162) of one of filter pipes (158) may be closed to remove the corresponding cleanout flange (164) without affecting the pressures within gas scrubber assembly (30). Each carbon sock filter positioned within the respective filter pipe (158) may then be removed from filter pipe (158) to service the carbon sock filter. In one example, two filter pipes (158) share a common discharge valve (162) and may be serviced accordingly. Each carbon sock filter is configured to remove any additional undesirable materials from the burnable gas not removed by other portions of gas scrubber assembly (30). For example, each carbon sock filter may be configured to filter tar gases from the burnable gas via solid state carbon adsorption. In some cases, one or more carbon socks may include biochar that has been extracted via biochar extraction assembly (32) and discharged from biochar discharge pipe (114). After the burnable gas passes through filter manifold (132), the burnable gas exits gasification unit (18) through filter discharge pipe (166). Filter discharge pipe (166) includes a stack vent (170) (see FIG. 2) in one example and is operatively connected to power generation assembly (14) (see FIG. 1) as discussed below in greater detail.

B. First Exemplary Power Generation Assembly

Referring again to FIG. 1, power generation assembly (14) is shown including an intermodal transportation 20-foot shipping container, which is shown in the present example as a container (180), housing a power generation unit (182). Container (180) comprises a housing (184) constructed of steel, aluminum, or plastic to provide a watertight enclosure that may be shipped in intermodal transportation by truck or ship. Housing (184) may have a length of about 20 ft (e.g., about 6.10 m), a width of about 8 ft (e.g., about 2.44 m), and/or a height of about 8.5 ft (e.g., about 2.59 m), for example.

Container (180) further comprises a plurality of doors (186) configured to allow access for servicing and operating power generation unit (182) through openings (188) created when any one or more of the plurality of doors (186) is in an open position. The plurality of doors (186) may be transitioned between the closed position and the open position by a hydraulic system including a controller (not shown), a plurality of pipes (not shown), wiring (not shown), actuation vales (not shown), a reservoir (not shown) with a working fluid and a plurality of hydraulic cylinders (not shown). The controller (not shown) sends an electrical control signal via wiring (not shown) to actuate valves (not shown) that divert pressurized hydraulic fluid produced by a pump (not shown) from reservoir (not shown) to the plurality of hydraulic cylinders (not shown) operatively attached to each of the plurality of doors (186). Hydraulic cylinders (not shown) act upon the plurality of doors (186) to transition doors (186) from the closed position to the open position. In order to close the doors (186), controller (not shown) sends the electric control signal via wiring (not shown) to actuation valves (not shown) that divert or release pressurized fluid from hydraulic cylinders (not shown) and return the working fluid to reservoir. In some examples, doors (186) may be manually raised by an operator without hydraulic system (not shown) from the closed position to the open position and vice versa. Doors (186) may be placed in the closed position prior to power generation assembly (14) being moved from its start location to its end location to securely house power generation unit (182) within container (180), and may be placed in the open position after power generation assembly (14) has reached its end location to facilitate operation of power generation unit (182).

In the example shown, a pipe bridge (189) extends from housing (184) of container (180) to housing (20) of container (16) for providing any suitable number of electrical and/or fluid conduits between power generation assembly (14) and thermochemical energy conversion assembly (12). For example, pipe bridge (189) may include a fluid conduit in communication with filter discharge pipe (166) for directing gases from filter discharge pipe (166) to a gaseous generator set (also referred to as a genset) (192) of power generation unit (182). Genset (192) may be configured to generate electric power using the gases received from filter discharge pipe (166) and to provide such electric power to an external circuit (e.g., a power grid).

In some versions, power generation unit (182) may be configured and operable similar to power generation unit (1182) described below.

II. Second Exemplary Power System with Thermochemical Energy Conversion Assembly and Power Generation Assembly In some instances, it may be desirable to provide power system (10) with an alternative thermochemical energy conversion assembly (1012) operatively connected to an alternative power generation assembly (1014) for producing a burnable gas and biochar from a biomass, which in the present example is in an oxygen limited environment, for generating electrical power. By way of further example, power generation assembly (1014) connects to thermochemical energy conversion assembly (1012) to receive burnable gas therefrom for generating the electrical power. In one example, thermochemical energy conversion assembly (1012) has a compact configuration suitable for intermodal transportation (e.g., via railcar, cargo ship, aircraft, truck, etc.) from a start location to an end location remote from the start location. Power generation assembly (1014) may also have a compact configuration suitable for intermodal transportation from a start location to an end location remote from the start location, which may be the same as or different from the start and/or end location(s), respectively, of thermochemical energy conversion assembly (1012). Thermochemical energy conversion assembly (1012) and power generation assembly (1014) may be similar to thermochemical energy conversion assembly (12) and power generation assembly (14) described above, respectively, except as otherwise described below.

A. Second Exemplary Thermochemical Energy Conversion Assembly

FIGS. 11-15 show thermochemical energy conversion assembly (1012) including a thermochemical energy conversion unit (1018) which may be housed within container (16) in place of thermochemical energy conversion unit (18), for example. Thermochemical energy conversion unit (1018) comprises a biomass feeding assembly (1026), a heat expansion assembly (1028), a gas scrubber assembly (1030), a biochar extraction assembly (1032), and a controller assembly (not shown) which may be configured and operable similar to controller assembly (34) described above. As described in the present example, thermochemical energy conversion unit (1018) may more particularly be described as a gasification unit (1018) given that the particular thermochemical conversion being performed by heat expansion assembly (1028) is gasification. By way of further example, a thermochemical energy conversion unit may also be described as a hydrothermal liquefaction unit, a pyrolysis unit, a torrefaction unit, or a combustion unit should heat expansion assembly be respectively performing hydrothermal liquefaction, pyrolysis, torrefaction, or combustion. Thermochemical energy conversion unit (1018) is thus not intended to be unnecessarily limited to any one of gasification, hydrothermal liquefaction, pyrolysis, torrefaction, combustion, or any other particular thermochemical energy conversion. Indeed, in one example, thermochemical energy conversion unit (1018) is configured for performing one or more processes of thermochemical energy conversion. Thermochemical energy conversion unit (1018), which may also be referred to as gasification unit (1018) below, is thus not intended to be limited to gasification.

i. Second Exemplary Biomass Feeding Assembly

Figure 11:
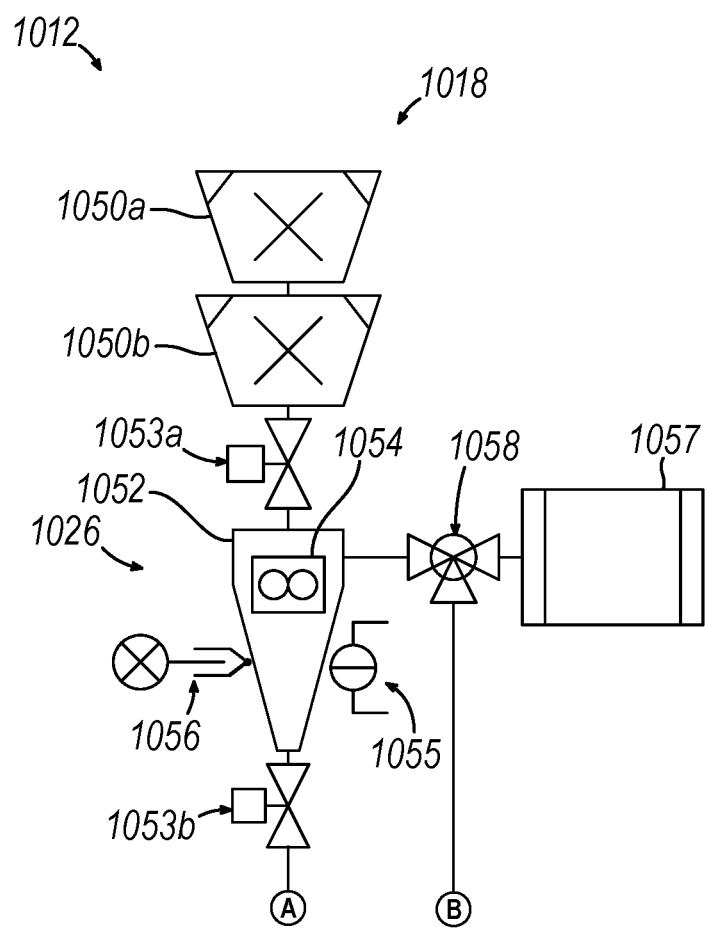
FIG. 11 depicts a partial schematic view of a thermochemical energy conversion unit of a second exemplary power system, showing a biomass feeding assembly of the thermochemical energy conversion unit.

FIG. 11 shows biomass feeding assembly (1026) including first and second biomass input devices (1050a, 1050b) and a housing (1052). Biomass of the present example is moved through biomass input devices (1050a, 1050b) without changing or releasing the pressures within housing (1052). In some versions, first and second biomass input devices (1050a, 1050b) are configured to cooperate with each other to render biomass feedstock into individual particles of a predetermined size, such that first and second biomass input devices (1050a, 1050b) may also be referred to as particle size control devices. For example, first biomass input device (1050a) may include a shredder configured to shred the biomass feedstock into small particles, and second biomass input device (1050b) may include a comminutor configured to reduce the small particles to even smaller (e.g., minute) particles having a predetermined size. In some cases, the comminutor may also be configured to remove moisture from the particles. Such a comminutor may include a natural resonance disintegration (NRD) mill, such as that by PulseWave Holdings, Inc. of Allen, Texas. As shown, biomass feeding assembly (1026) also includes a pair of valves in the form of first and second rotary airlocks (1053a, 1053b) each having a rotatable vane that is driven by an electric motor via a transmission. The rotatable vane of first rotary airlock (1053a) seals the ambient environment from an interior chamber within housing (1052), while allowing biomass to be moved from second biomass input device (1050b) into housing (1052). Once biomass is within housing (1052), the biomass falls by gravity to a bottom portion of housing (1052).

As shown, housing (1052) is equipped with a freefall mass metering sensor in the form of a microwave sensor (1054) that is configured to detect the mass of each particle of the biomass falling by gravity through housing (1052). Sensor (1054) may be in operative communication with a controller of the controller assembly of thermochemical energy conversion unit (1018) to provide one or more signals to the controller indicative of the detected mass so that controller may continuously monitor the mass of biomass being inputted to heat expansion assembly (1028) and/or take action responsive thereto. For example, the controller may be configured to actuate the electric motor of one or both rotary airlocks (1053a, 1053b) to drive one or both rotary airlocks (1053a, 1053b) responsively to the monitored mass of biomass for providing a predetermined and/or continuous amount of biomass to heat expansion assembly (1028). As shown, housing (1052) is also equipped with a level sensor (1055) and a combined temperature and pressure sensor (1056), which may also each be in operative communication with the controller of the controller assembly of thermochemical energy conversion unit (1018) to provide one or more signals to the controller indicative of the detected level, temperature, and pressure so that the controller may continuously monitor the level, temperature, and pressure within housing (1052) and/or take action responsive thereto.

While first and second rotary airlocks (1053a, 1053b) are shown, it will be appreciated that any suitable type and/or number of valve(s) may be used. For example, biomass input device (1050) may include one or more knife gate valves in addition to or in lieu of one or both rotary airlocks (1053a, 1053b).

In the example shown, housing (1052) is configured to be selectively placed into and out of fluid communication with an environmental control module methodology selector (1057) via a three-way valve (1058). Environmental control module methodology selector (1057) may be configured to direct a gas into housing (1052) when placed into fluid communication with housing (1052) via three-way valve (1058). Such a gas may include any one or more of an inert gas, atmospheric air, carbon dioxide, nitrogen, argon, and/or an oxidizer, for example. In addition, or alternatively, environmental control module methodology selector (1057) may be configured to apply suction to housing (1052) for providing a vacuum therein when placed into fluid communication with housing (1052) via three-way valve (1058). In some versions, environment control module methodology selector (1057) may communicate with or may be incorporated directly into the controller assembly of thermochemical energy conversion unit (1018).

ii. Second Exemplary Heat Expansion Assembly

Figure 12:
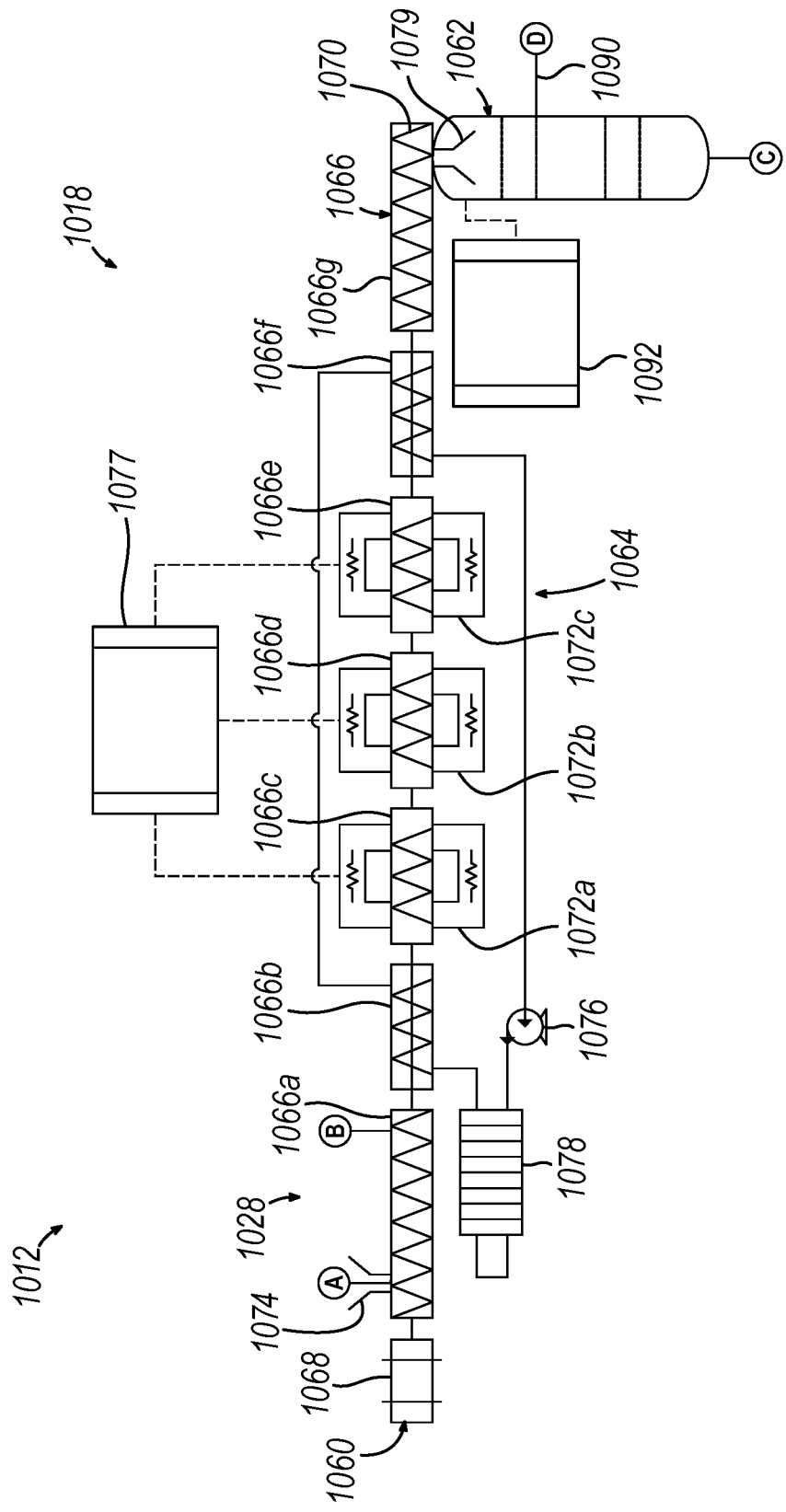
FIG. 12 depicts a partial schematic view of the thermochemical energy conversion unit of FIG. 11, showing a heat expansion assembly of the thermochemical energy conversion unit.

Referring now to FIG. 12, in one example, heat expansion assembly (1028) comprises a reactor (1060), at least one separator (1062), and a fluid circuit (1064). Reactor (1060) in one example includes a shell (1066), a drive assembly (1068), a conveyor in the form of an auger (1070) that is rotatably disposed within shell (1066) and configured to be driven via drive assembly (1068), and at least one induction heater (1072a, 1072b, 1072c) positioned about at least a portion of shell (1066). In the example shown, reactor (1060) includes a first induction heater (1072a), a second induction heater (1072b), and a third induction heater (1072c). While three induction heaters (1072a, 1072b, 1072c) are shown, it will be appreciated that any suitable number of induction heaters (1072a, 1072b, 1072c), such as one, two, or more than three, may be used. Shell (1066) of the present example includes a plurality of shell segments (1066a, 1066b, 1066c, 1066d, 1066e, 1066f, 1066g) which auger (1070) extends continuously through, including an input segment (1066a), a pre-heating segment (1066b), at least one induction heating segment (1066c, 1066d, 1066e), a cooling segment (1066f), and an output segment (1066g). In the example shown, shell (1066) includes a first induction heating segment (1066c), a second induction heating segment (1066d), a third induction heating segment (1066e), corresponding to first induction heater (1072a), second induction heater (1072b), and third induction heater (1072c).

Input segment (1066a) is configured to receive biomass from biomass feeding assembly (1026) via a reactor inlet (1074). In the example shown, input segment (1066a) is also configured to be selectively placed into and out of fluid communication with environmental control module methodology selector (1057) via three-way valve (1058) (see FIG. 11). Environmental control module methodology selector (1057) may be configured to direct a gas into housing input segment (1066a) when placed into fluid communication with housing input segment (1066a) via three-way valve (1058). Such a gas may include any one or more of an inert gas, atmospheric air, carbon dioxide, nitrogen, argon, and/or an oxidizer, for example. In addition, or alternatively, environmental control module methodology selector (1057) may be configured to apply suction to input segment (1066a) for providing a vacuum therein when placed into fluid communication with input segment (1066a) via three-way valve (1058). Auger (1070) is configured to convey biomass and any gas that may have been received from environmental control module methodology selector (1057) from input segment (1066a) to pre-heating segment (1066b).

A heating jacket (not shown) is positioned around an exterior of pre-heating segment (1066b) and is supplied with a heated fluid (e.g., glycol) of fluid circuit (1064) via a pump (1076) to pre-heat the biomass as the biomass is conveyed through pre-heating segment (1066b) by auger (1070). For example, thermal energy may be transferred from the fluid of fluid circuit (1064) to the biomass, and the cooled fluid may then be circulated toward cooling segment (1066f) via pump (1076), as described in greater detail below. Auger (1070) is configured to convey biomass and any gas that may have been received from environmental control module methodology selector (1057) from pre-heating segment (1066b) to first induction heating segment (1066c).

First induction heater (1072a) is positioned around an exterior of first induction heating segment (1066c). First induction heater (1072a) may include an inductor (also referred to as a heater) in the form of a heating coil, which may itself include a wire (not shown) wound about the exterior of first induction heating segment (1066c). The wire may comprise a metallic material having relatively high electrical conductivity, such as copper. The heating coil is operatively coupled to a thermodynamic control module induction controller (1077), which may be configured to drive the heating coil to produce an alternating current thereby producing an alternating magnetic field at or near the heating coil. This field may generate an electromagnetic field (EMF) on the inner surface of shell (1066) and/or the surfaces of auger (1070) within first induction heating segment (1066c), which may in turn cause an alternating current. This current, in conjunction with the resistivity of shell (1066) and/or auger (1070), may yield power dissipation and heat up the inner surface of shell (1066) and/or the surfaces of auger (1070) within first induction heating segment (1066c). Such heat may be transferred to the contents of first induction heating segment (1066c), such as biomass and any gas that may have been received from environmental control module methodology selector (1057). In some cases, the material of shell (1066) and/or auger (1070) may be selected to promote such induction heating. For example, shell (1066) and/or auger (1070) may comprise steel.

Second induction heater (1072b) is positioned around an exterior of second induction heating segment (1066d). Second induction heater (1072b) may be configured and operable similar to first induction heater (1072a). For example, second induction heater (1072b) may include an inductor (also referred to as a heater) in the form of a heating coil, which may itself include a wire (not shown) wound about the exterior of second induction heating segment (1066d). The heating coil is operatively coupled to thermodynamic control module induction controller (1077), which may be configured to drive the heating coil to produce an alternating current thereby producing an alternating magnetic field at or near the heating coil. This field may generate an electromagnetic field (EMF) on the inner surface of shell (1066) and/or the surfaces of auger (1070) within second induction heating segment (1066d), which may in turn cause an alternating current. This current, in conjunction with the resistivity of shell (1066) and/or auger (1070), may yield power dissipation and heat up the inner surface of shell (1066) and/or the surfaces of auger (1070) within second induction heating segment (1066d). Such heat may be transferred to the contents of second induction heating segment (1066d), such as biomass and any gas that may have been received from environmental control module methodology selector (1057).

Third induction heater (1072c) is positioned around an exterior of third induction heating segment (1066e). Third induction heater (1072c) may be configured and operable similar to first induction heater (1072a). For example, third induction heater (1072c) may include an inductor (also referred to as a heater) in the form of a heating coil, which may itself include a wire (not shown) wound about the exterior of third induction heating segment (1066e). The heating coil is operatively coupled to thermodynamic control module induction controller (1077), which may be configured to drive the heating coil to produce an alternating current thereby producing an alternating magnetic field at or near the heating coil. This field may generate an electromagnetic field (EMF) on the inner surface of shell (1066) and/or the surfaces of auger (1070) within third induction heating segment (1066e), which may in turn cause an alternating current. This current, in conjunction with the resistivity of shell (1066) and/or auger (1070), may yield power dissipation and heat up the inner surface of shell (1066) and/or the surfaces of auger (1070) within third induction heating segment (1066e). Such heat may be transferred to the contents of third induction heating segment (1066e), such as biomass and any gas that may have been received from environmental control module methodology selector (1057).

Biomass is heated within any one or more of induction heating segments (1066c, 1066d, 1066e) to one or more predetermined temperatures in a low oxygen environment separating the biomass into burnable gas and biochar. In some cases, biomass may be heated within first, second, and third induction heating segments (1066c, 1066d, 1066e) to a single predetermined temperature corresponding to a single desired thermochemical energy conversion, such as gasification, for example. It will be appreciated that the introduction of gas such as atmospheric air via environmental control module methodology selector may promote efficient and effective gasification.

In addition, or alternatively, biomass may be sequentially heated within induction heating segments (1066c, 1066d, 1066e) to any number of predetermined temperatures, corresponding to any number of desired thermochemical energy conversions to be performed within the respective heating segments (1066c, 1066d, 1066e). For example, biomass may be suitably heated in any one or more of first, second, and third induction heating segments (1066c, 1066d, 1066e) to achieve any one or more of gasification, hydrothermal liquefaction, pyrolysis, torrefaction, and/or combustion. In some cases, biomass may initially be heated in first induction heating segment (1066c) to a first predetermined temperature to achieve a first thermochemical energy conversion such as torrefaction; may subsequently be heated in second induction heating segment (1066d) to a second predetermined temperature to achieve a second thermochemical energy conversion such as pyrolysis; and may finally be heated in third induction heating segment (1066e) to a third predetermined temperature to achieve a third thermochemical energy conversion such as gasification. To that end, induction heaters (1072a, 1072b, 1072c) may be independently controlled relative to each other via thermodynamic control module induction controller (1077) to heat biomass to the respective predetermined temperatures. In some versions, thermodynamic control module induction controller (1077) may communicate with or may be incorporated directly into the controller assembly of thermochemical energy conversion unit (1018).

Auger (1070) is configured to convey biomass, burnable gas, and/or biochar from first induction heating segment (1066c) to second induction heating segment (1066d), and from second induction heating segment (1066d) to third induction heating segment (1066e). Auger (1070) is further configured to convey the burnable gasses and biochar from third induction heating segment (1066e) to cooling segment (1066f).

A cooling jacket (not shown) is positioned around an exterior of cooling segment (1066f) and is supplied with the cooled fluid of fluid circuit (1064) that has exited the heating jacket of pre-heating segment (1066b) to cool the burnable gasses and biochar as the burnable gasses and biochar are conveyed through cooling segment (1066f) by auger (1070). For example, thermal energy may be transferred from the burnable gasses and biochar to the fluid of fluid circuit (1064), and the heated fluid may then be recirculated toward pre-heating segment (1066b) via pump (1076).

In the example shown, a heat exchanger (1078) is provided between pump (1076) and pre-heating segment (1066b). Heat exchanger (1078) may be configured to either increase or decrease the temperature of the fluid of fluid circuit (1064) traveling therethrough, as may be desired. In cases where heat exchanger (1078) is included, fluid circuit (1064) may be referred to as an active pre-heating fluid circuit (1064). In some versions, heat exchanger (1078) may be configured to transfer thermal energy between the fluid of fluid circuit (1064) and any other suitable component of thermochemical energy conversion unit (1018), such as a portion of biochar extraction assembly (1032), as described in greater detail below. In cases where heat exchanger (1078) is omitted, fluid circuit (1064) may be referred to as a passive pre-heating fluid circuit (1064).

Auger (1070) is configured to convey the burnable gasses and biochar from cooling segment (1066f) to output segment (1066g). Output segment (1066g) is configured to discharge biomass from reactor (1060) to separator (1062) via a reactor outlet (1079).

Separator (1062) in one example is a Thien baffle separator (1062). In this regard, separator (1062) may include a hot gas filter or register that is configured to cause the burnable gas biochar mixture to spiral and thereby apply centripetal force to encourage biochar to fall out from the burnable gas biochar mixture allowing the gasses to rise through a gas discharge connected to gas discharge pipe (1090) that extends towards gas scrubber assembly (1030). In some cases, the gasses may be gently picked up by a vacuum provided within gas discharge pipe (1090), for example. In the example shown, separator (1062) is operatively coupled to a hot gas analyzer (1092) configured to continuously monitor the gases within separator (1062). In some versions, hot gas analyzer (1092) may communicate with or may be incorporated directly into the controller assembly of thermochemical energy conversion unit (1018). The particles of biochar exit through a bottom portion of separator (1062) and enter biochar extraction assembly (1032), as described in greater detail below. In some versions, separator (1062) may include one or more cyclone separators similar to those described above.

iii. Second Exemplary Biochar Extraction Assembly

Figure 13:
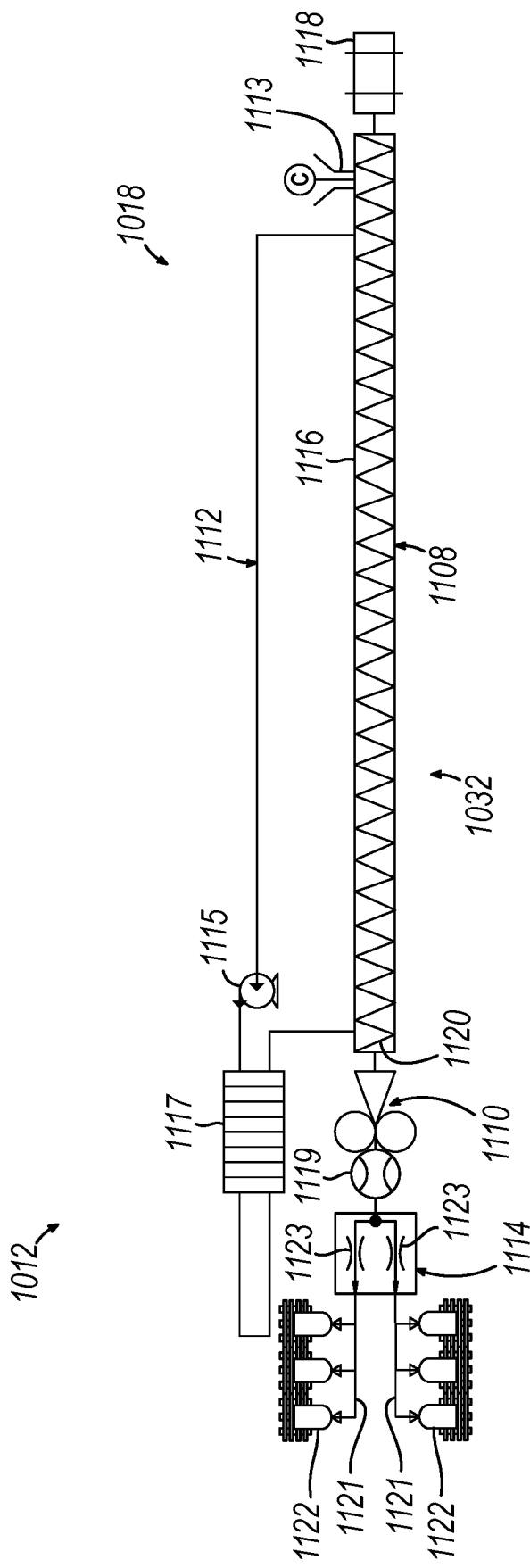
FIG. 13 depicts a partial schematic view of the thermochemical energy conversion unit of FIG. 11, showing a biochar extraction assembly of the thermochemical energy conversion unit.

With respect to FIG. 13, biochar extraction assembly (1032) includes a biochar auger assembly (1108), a pelletizer (1110), a fluid circuit (1112), and a biochar packaging assembly (1114). Biochar auger assembly (1108) includes a shell (1116), a drive assembly (1118), an auger (1120), and a cooling jacket (not shown). Biochar auger assembly (1108) is configured to receive the particles of biochar extracted from separator (1062) via an extractor inlet (1113). Auger (1120) is positioned within shell (1116) and is driven by drive assembly (1118) positioned external to shell (1116). Drive assembly (1118) spins auger (1120) to move biochar from inlet (1113) toward pelletizer (1110). The cooling jacket is positioned around an exterior of shell (1116) and is supplied with cooled fluid of fluid circuit (1112) via a pump (1115) to cool the biochar as the biochar is conveyed through shell (1116) by auger (1020). For example, thermal energy may be transferred from the biochar to the fluid of fluid circuit (1112), and the heated fluid may then be recirculated via pump (1115). In the example shown, a heat exchanger (1117) is provided between pump (1115) and shell (1116). Heat exchanger (1117) may be configured to decrease the temperature of the fluid of fluid circuit (1112) traveling therethrough. For example, heat exchanger (1117) may be configured to provide cryogenic cooling of the biochar. In some versions, heat exchanger (1117) may be configured to transfer thermal energy between the fluid of fluid circuit (1112) and any other suitable component of thermochemical energy conversion unit (1018), such as a portion of heat expansion assembly (1028). For example, heat exchanger (1117) may be configured to transfer thermal energy that the fluid of fluid circuit (1112) has acquired from the biochar to the fluid of fluid circuit (1064), which may then be circulated to pre-heating segment (1066b) of reactor (1060) so that such thermal energy may be transferred to the biomass within pre-heating segment (1066b).

Auger assembly (1108) is configured to discharge the biochar into pelletizer (1110). When the biochar is discharged into pelletizer (1110), the biochar has been reduced in temperature such that the biochar generally will not turn to ash upon being introduced into the surrounding environment and may be handled, such as moved to another site. In this regard, pelletizer (1110) in one example is configured to compress the biochar into multiple pellets to facilitate storage and/or transportation of the biochar. In the example shown, pelletizer (1110) discharges the pellets into a mass meter (1119) that is configured to detect the mass of pellets discharged from pelletizer (1110) and directed to biochar packaging assembly (1114). Biochar packaging assembly (1114) of the present example includes a pair of distribution pipes (1121) configured to dispense the pellets into respective sets of containers in the form of bags (1122), and a pair of valves (1123) configured to selectively place the respective distribution pipes (1121) into and out of communication with pelletizer (1110). Mass meter (1119) may be in operative communication with a control module of biochar packaging assembly (1114) to provide one or more signals to the control module indicative of the detected mass so that the control module may continuously monitor the mass of pellets being outputted from pelletizer (1110) and/or take action responsive thereto. For example, the control module may be configured to open and/or close one or both valves (1123) responsively to the monitored mass of pellets for providing a predetermined amount of pellets to each bag (1122). In some versions, the control module of biochar packaging assembly (1114) may communicate with or may be incorporated directly into the controller assembly of thermochemical energy conversion unit (1018).

iv. Second Exemplary Gas Scrubber Assembly

Figure 14:
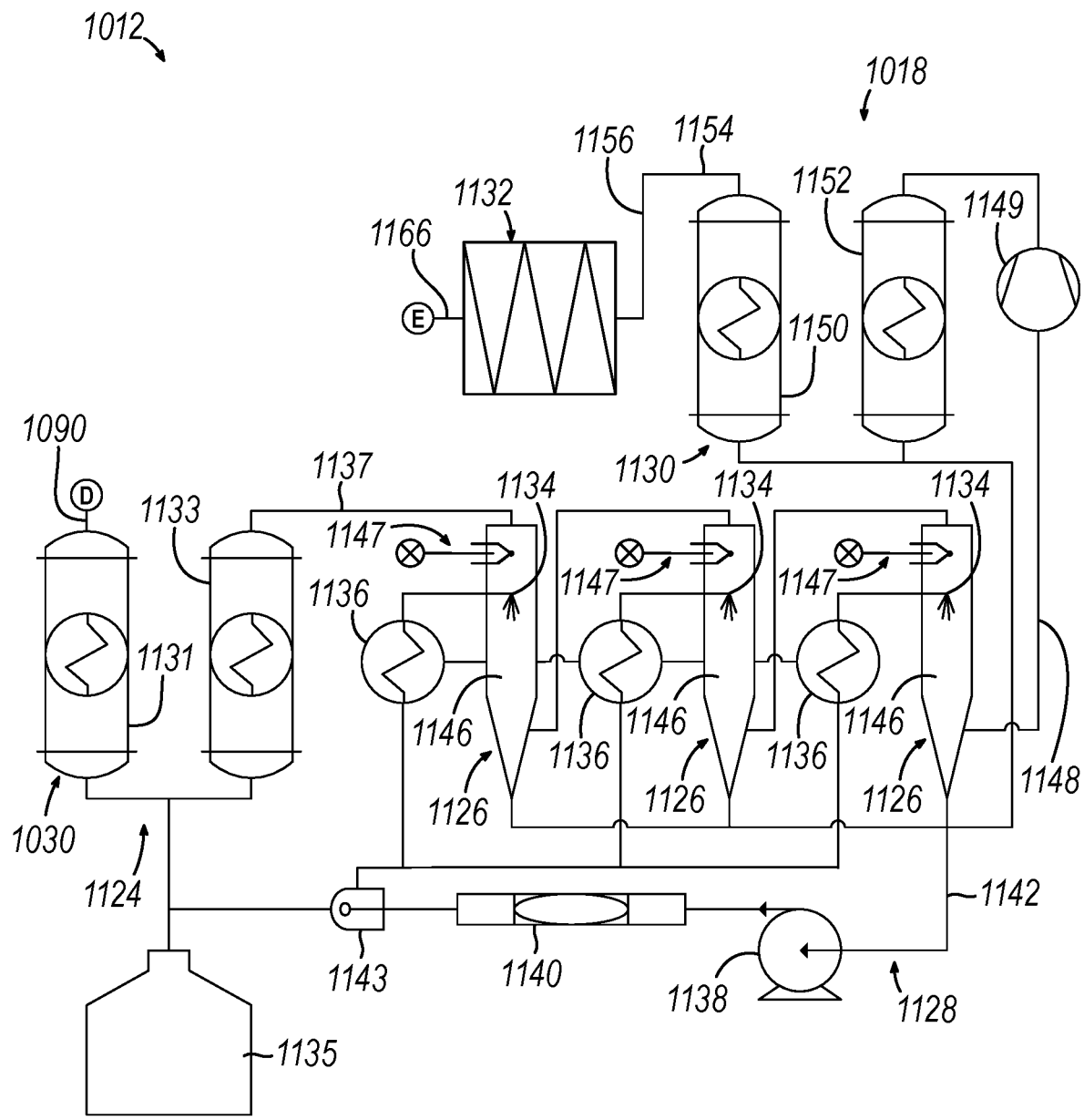
FIG. 14 depicts a partial schematic view of the thermochemical energy conversion unit of FIG. 11, showing a gas scrubber assembly of the thermochemical energy conversion unit.

FIG. 14 shows gas scrubber assembly (1030). Gas scrubber assembly (1030) comprises a first shell and tube heat exchanger assembly (1124), a plurality of venturi risers (1126), a closed water distribution system (1128), a second shell and tube heat exchanger assembly (1130), and a filter manifold (1132). Gas discharge pipe (1090) directs the burnable gas from separator (1062) to first shell and tube heat exchanger assembly (1124) to cool the burnable gas and/or condense moisture entrained therein. In the present example, first shell and tube heat exchanger assembly (1124) includes a pair of shell and tube heat exchangers (1131, 1133) connected at a bottom portion (e.g., via a drain) to a bio-oil collection tank (1135) that collects bio-oils condensed within first shell and tube heat exchanger assembly (1124). In some versions, the primary function of first shell and tube heat exchanger (1131) may be to condense moisture entrained in the burnable gas (e.g., bio-oils), while the primary function of second shell and tube heat exchanger (1133) may be to reduce the temperature of the burnable gas, though it will be appreciated that one or both shell and tube heat exchangers (1131, 1133) may perform either or both function(s). A shell and tube discharge pipe (1137) extends from first shell and tube heat exchanger assembly (1124) and connects to a first of the plurality of venturi risers (1126), such that the burnable gas then enters the plurality of venturi risers (1126). The plurality of venturi risers (1126) are arranged vertically and are arranged in series.

Closed water distribution system (1128) of the present example includes a plurality of nozzles (1134), a plurality of cooling coils (1136), a pump (1138), a reservoir (1140), and a return manifold (1142). Each nozzle (1134) is located at a top portion of a respective venturi riser (1126) and is configured to spray fluid, which in the present example is water, into the burnable gas passing through the respective venturi riser (1126) in a corresponding conical spray pattern having a corresponding spray angle to remove undesirable materials from the burnable gas and fall out through a bottom portion of the respective venturi riser (1126). In some versions, each nozzle (1134) may be configured to spray the fluid in a unique conical spray pattern different from that of the other nozzles (1134). For example, each nozzle (1134) may be configured to spray the fluid at a corresponding spray angle different from those of the other nozzles (1134). The bottom portion of each venturi riser (1126) is connected to return manifold (1142) of water distribution system (1128). Return manifold (1142) is connected to reservoir (1140), which is connected to pump (1138) suppling pressurized water that passes through cooling coils (1136) before reaching nozzles (1134). Cooling coils (1136) add additional cooling to the water before being delivered to nozzles (1134). In the example shown, an oil separator (1143) is provided between reservoir (1140) and cooling coils (1136) for removing any bio-oil that may be entrained within the water and discharging such bio-oil to bio-oil collection tank (1135).

Each venturi riser (1126) includes an external cooling jacket, and a venturi (1146). In the present example, there are three venturi risers (1126), however any number of venturi risers (1126) may be used that provide an adequate pressure drop, remove undesirable materials, and cool the burnable gas. Venturi risers (1126) each respectively increase the velocity of the burnable gas with a correspondingly decrease in pressure in accordance with the venturi effect. Each external cooling jacket is located on an external shell of each venturi riser (1126) and is provided glycol to cool the burnable gases to create condensation further removing undesirable materials, which may be entrained with the water and drain out of the respective venturi risers (1126) into return manifold (1142). In some cases, some water may cling to and travel downwardly along an inner surface of the respective shell via capillary action, and may drain out of the respective venturi risers (1126) into return manifold (1142). In the example shown, each venturi riser (1126) is equipped with a combined temperature and pressure sensor (1147).

After the burnable gas passes through the plurality of venturi risers (1126) the burnable gas continues through a venturi discharge pipe (1148) to an inline gas booster (1149) and then to second shell and tube heat exchanger assembly (1130). Second shell and tube heat exchanger assembly (1130) further cool the burnable gas and/or further condense moisture entrained therein. In the present example, second shell and tube heat exchanger assembly (1130) includes a pair of shell and tube heat exchangers (1150, 1152) connected at a bottom portion to return manifold (1142) that returns additional undesirable materials to reservoir (1140) carried away by the condensation within shell and tube heat exchanger assembly (130). In some versions, the primary function of first shell and tube heat exchanger (1150) may be to condense moisture entrained in the burnable gas (e.g., from venturi risers (1126)), while the primary function of second shell and tube heat exchanger (1152) may be to reduce the temperature of the burnable gas, though it will be appreciated that one or both shell and tube heat exchangers (1150, 1152) may perform either or both function(s). A shell and tube discharge pipe (1154) extends from shell and tube heat exchanger assembly (1130) and connects to a vertical manifold pipe (1156). The burnable gas continues to flow through vertical manifold pipe (1156) toward filter manifold (1132).

As shown, vertical manifold pipe (1156) connects to filter manifold (1132) extending horizontally from vertical manifold pipe (1156). Filter manifold (1132) may be configured and operable similar to filter manifold (132). For example, filter manifold (1132) may include a plurality of filter pipes and a plurality of carbon sock filters (not shown) disposed within the filter pipes. In some cases, one or more carbon socks may include pellets formed from the biochar that has been extracted via biochar extraction assembly (1032) and dispensed from biochar packaging assembly (1114).

After the burnable gas passes through filter manifold (1132), the burnable gas exits gasification unit (1018) through filter discharge pipe (1166). Filter discharge pipe (1166) is operatively connected to power generation assembly (1014) (see FIG. 15) as discussed below in greater detail.

B. Second Exemplary Power Generation Assembly

Figure 15:
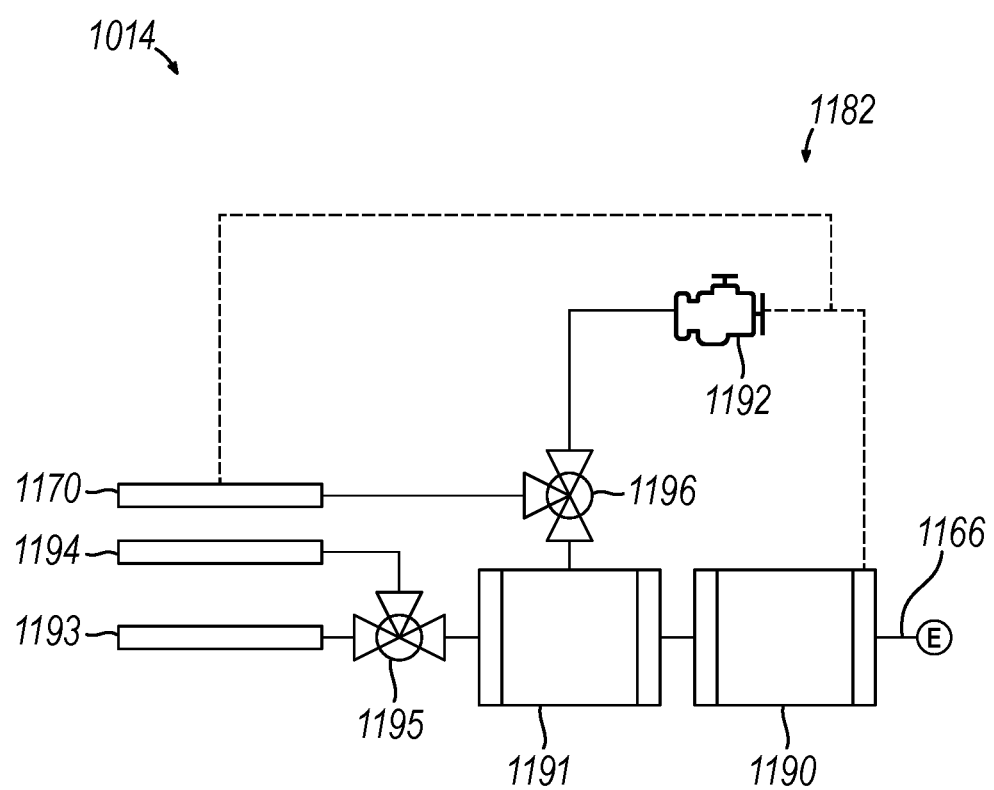
FIG. 15 depicts a schematic view of a power generation unit of the second exemplary power system.

FIG. 15 shows power generation assembly (1014) including a power generation unit (1182) which may be housed within container (180) in place of power generation unit (182), for example. Power generation unit (1182) comprises a gas analyzer (1190), an intelligent fuel management system (1191), and a gaseous generator set (also referred to as a genset) (1192). Gas analyzer (1190) is configured to continuously monitor the gases received from filter discharge pipe (1166), as well as the emissions of the entire power system as described in greater detail below. In some cases, the gases may be delivered to gas analyzer (1190) from filter discharge pipe (1166) via a pipe bridge (not shown) that is configured and operable similar to pipe bridge (189).

Intelligent fuel management system (1191) is configured to automatically mix and blend the gases received from filter discharge pipe (1166) responsively to the qualities of the gases monitored by gas analyzer (1190) to promote proper operation of genset (1192). In the example shown, intelligent fuel management system (1191) is configured to be selectively placed into and out of fluid communication with an atmospheric air intake (1193) and/or with a supplemental fuel supply (1194) via a three-way valve (1195). Intelligent fuel management system (1191) may be configured to mix the gases received from filter discharge pipe (1166) with atmospheric air when placed into fluid communication with atmospheric air intake (1193) via three-way valve (1195). In addition, or alternatively, intelligent fuel management system (1191) may be configured to mix the gases received from filter discharge pipe (1166) with supplemental fuel when placed into fluid communication with supplemental fuel supply (1194) via three-way valve (1195). Such a supplemental fuel may include any one or more of natural gas and/or propane, for example.

Intelligent fuel management system (1191) is also configured to regulate the delivery of gases to genset (1192) and to a stack vent (1170) responsively to the electrical demand for genset (1192). In the example shown, intelligent fuel management system (1191) is configured to be selectively placed into and out of fluid communication with genset (1192) and/or with stack vent (1170) via a three-way valve (1196). Intelligent fuel management system (1191) may be configured to deliver the gases to stack vent (1170) when placed into fluid communication with stack vent (1170) via three-way valve (1196). In addition, or alternatively, intelligent fuel management system (1191) may be configured to deliver the gases to genset (1192) when placed into fluid communication with genset (1192) via three-way valve (1196).

Stack vent (1170) may be configured to ignite the gases received from intelligent fuel management system (1191) to burn off any volatiles prior to reaching the external environment. In some versions, stack vent (1170) is equipped with an emission sensor (not shown) in operative communication with gas analyzer (1190) to provide one or more signals to gas analyzer (1190) indicative of the detected emissions so that gas analyzer (1190) may continuously monitor the emissions of stack vent (1170) and/or take action responsive thereto.

Genset (1192) may be configured to generate electric power using the gases received from intelligent fuel management system (1191) and to provide such electric power to an external circuit (e.g., a power grid). In some versions, genset (1192) is equipped with an emission sensor (not shown) in operative communication with gas analyzer (1190) to provide one or more signals to gas analyzer (1190) indicative of the detected emissions so that gas analyzer (1190) may continuously monitor the emissions of genset (1192) and/or take action responsive thereto.

While stack vent (1170), gas analyzer (1190), intelligent fuel management system (1191), genset (1192), atmospheric air intake (1193), supplemental fuel supply (1194), and three-way valves (1195, 1196) have been described as components of power generation unit (1182), it will be appreciated that any one or more of these components may be incorporated into thermochemical energy conversion unit (1018). For example, stack vent (1170) may be incorporated into thermochemical energy conversion unit (1018) in a manner similar to that described above. In addition, or alternatively, gas analyzer (1190) and/or intelligent fuel management system (1191) may communicate with or may be incorporated directly into the controller assembly of thermochemical energy conversion unit (1018).

III. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

EXAMPLE 1

A thermochemical energy conversion unit, comprising: (a) a heat expansion assembly including: (i) a reactor configured to receive a biomass and convert the biomass into a burnable gas having undesirable materials therein and a biochar, and (ii) a heat expansion discharge pipe configured to discharge the burnable gas from the heat expansion assembly; and (b) a gas scrubber assembly operatively connected to the heat expansion assembly and configured to receive the burnable gas therefrom and to remove the undesirable materials from the burnable gas, wherein the gas scrubber assembly includes a scrubber discharge pipe configured to discharge the burnable gas from the gas scrubber assembly, wherein the heat expansion assembly and the gas scrubber assembly are configured to be continuously fluidly connected from the heat expansion discharge pipe to the scrubber discharge pipe for generating a continuous flow of the burnable gas therealong.

EXAMPLE 2

The thermochemical energy conversion unit of Example 1, wherein the reactor includes: (A) a shell, and (B) a conveyor disposed within the shell and configured to convey the biomass through the shell.

EXAMPLE 3

The thermochemical energy conversion unit of Example 2, wherein the conveyor includes an auger.

EXAMPLE 4

The thermochemical energy conversion unit of any one or more of Examples 2 through 3, wherein the reactor further includes at least one induction heater positioned about the shell and configured to inductively heat each of the shell and the conveyor for converting the biomass into the burnable gas and the biochar.

EXAMPLE 5

The thermochemical energy conversion unit of Example 4, wherein the at least one induction heater includes a plurality of induction heaters positioned about respective segments of the shell.

EXAMPLE 6

The thermochemical energy conversion unit of any one or more of Examples 2 through 5, wherein the heat expansion assembly further includes a fluid circuit configured to transfer thermal energy between a fluid and at least one segment of the shell.

EXAMPLE 7

The thermochemical energy conversion unit of Example 6, wherein the at least one segment of the shell is upstream of the reactor.

EXAMPLE 8

The thermochemical energy conversion unit of Example 6, wherein the at least one segment of the shell is downstream of the reactor.

EXAMPLE 9

The thermochemical energy conversion unit of any one or more of Examples 1 through 8, wherein the heat expansion assembly further includes at least one separator configured to separate the burnable gas and the biochar from each other.

EXAMPLE 10

The thermochemical energy conversion unit of Example 9, wherein the at least one separator includes at least one of a cyclone separator or a Thien baffle separator.

EXAMPLE 11

The thermochemical energy conversion unit of any one or more of Examples 1 through 10, further comprising a biochar extraction assembly operatively connected to the heat expansion assembly and configured to receive the biochar therefrom, wherein the biochar extraction assembly includes: (i) a shell, and (ii) a conveyor disposed within the shell and configured to convey the biochar through the shell.

EXAMPLE 12

The thermochemical energy conversion unit of Example 11, wherein the biochar extraction assembly further includes a fluid circuit configured to transfer thermal energy between a fluid and at least one segment of the shell.

EXAMPLE 13

The thermochemical energy conversion unit of any one or more of Examples 1 through 12, further comprising a biomass feeding assembly operatively connected to the heat expansion assembly and configured to feed the biomass thereto, wherein the biomass feeding assembly is configured to control a particle size of the biomass.

EXAMPLE 14

A thermochemical energy conversion assembly, comprising: (a) an intermodal transportation shipping container; and (b) the thermochemical energy conversion unit of any one or more of Examples 1 through 13, wherein the thermochemical energy conversion unit is received within the intermodal transportation shipping container.

EXAMPLE 15

A power system, comprising: (a) the thermochemical energy conversion assembly of Example 14; and (b) a power generation assembly operatively connected to the thermochemical energy conversion assembly, wherein the power generation assembly is configured to receive the burnable gas from the thermochemical energy conversion assembly and to generate electric power using the burnable gas.

EXAMPLE 16

A reactor including: (a) a shell defining a hollow interior configured to receive a biomass; (b) a conveyor disposed within the shell and configured to convey the biomass through the shell; and (c) at least one induction heater positioned about the shell and configured to inductively heat each of the shell and the conveyor for converting the biomass into a burnable gas having undesirable materials therein and a biochar while the biomass is continuously conveyed through the shell by the conveyor.

EXAMPLE 17

The reactor of Example 16, wherein the conveyor includes an auger.

EXAMPLE 18

A method of performing a thermochemical energy conversion using a heat expansion assembly having a reactor and a heat expansion discharge pipe, and a gas scrubber assembly having a scrubber discharge pipe, the method comprising: (a) delivering a biomass to the reactor; (b) converting the biomass into a burnable gas having undesirable materials therein and a biochar via the reactor; (c) discharging the burnable gas from the heat expansion assembly via the heat expansion discharge pipe; (d) removing the undesirable materials from the burnable gas via the gas scrubber assembly; (e) discharging the burnable gas from the gas scrubber assembly via the scrubber discharge pipe; and (f) generating a continuous flow of the burnable gas from the heat expansion discharge pipe to the scrubber discharge pipe.

EXAMPLE 19

The method of Example 18, wherein the act of converting the biomass into the burnable gas and the biochar via the reactor is performed while conveying the biomass through the reactor.

EXAMPLE 20

The method of any one or more of Examples 18 through 19, wherein the act of converting the biomass into the burnable gas and the biochar includes heating the biomass via induction heating within the reactor.

EXAMPLE 21

A thermochemical energy conversion unit, comprising: (a) a heat expansion assembly having a reactor configured to receive a biomass and convert the biomass into a burnable gas and a biochar; and (b) a gas scrubber assembly operatively connected to the heat expansion assembly, the gas scrubber assembly including: (i) a manifold pipe configured to receive the burnable gas from the heat expansion assembly, (ii) a filter discharge pipe, (iii) a first filter pipe configured to fluidly connect between the manifold pipe and the filter discharge pipe, (iv) a second filter pipe configured to fluidly connect between the manifold pipe and the filter discharge pipe, and (v) a plurality of valves fluidly connected between the manifold pipe and the filter discharge pipe, wherein the plurality of valves is configured to close at least one of the first and second filter pipes while at least one of the first and second filter pipes remains open for attending to maintenance of the gas scrubber assembly while allowing continuous flow of the burnable gas from the manifold pipe to the filter discharge pipe.

EXAMPLE 22

The thermochemical energy conversion unit of Example 21, wherein the first and second filter pipe are fluidly connected in parallel between the manifold pipe and the filter discharge pipe.

EXAMPLE 23

The thermochemical energy conversion unit of any one or more of Examples 21 through 22, wherein the plurality of valves are configured to collectively adjust between a first flow state and a second flow state, wherein the plurality of valves in the first flow state are configured to direct the burnable gas from the manifold pipe through the first filter pipe and to the filter discharge pipe while blocking the burnable gas from flowing through the second filter pipe.

EXAMPLE 24

The thermochemical energy conversion unit of Example 23, wherein the plurality of valves in the second flow state are configured to direct the burnable gas from the manifold pipe through the second filter pipe and to the filter discharge pipe while blocking the burnable gas from flowing through the first filter pipe.

EXAMPLE 25

The thermochemical energy conversion unit of Example 24, wherein the gas scrubber assembly further includes a first intake valve and a first discharge valve, wherein the first intake valve is fluidly connected between the manifold pipe and the first filter pipe, and wherein the first discharge valve is fluidly connected between the first filter pipe and the filter discharge pipe.

EXAMPLE 26

The thermochemical energy conversion unit of Example 25, wherein the gas scrubber assembly further includes a second intake valve and a second discharge valve, wherein the second intake valve is fluidly connected between the manifold pipe and the second filter pipe, and wherein the second discharge valve is fluidly connected between the second filter pipe and the filter discharge pipe.

EXAMPLE 27

The thermochemical energy conversion unit of any one or more of Examples 21 through 26, wherein the first filter pipe includes a first cleanout portion configured to removably receive a first filter, and wherein the second filter pipe includes a second cleanout portion configured to removably receive a second filter.

EXAMPLE 28

The thermochemical energy conversion unit of Example 27, further including the first and second filters, wherein the first filter has a first carbon sock filter, and wherein the second filter has a second carbon sock filter.

EXAMPLE 29

The thermochemical energy conversion unit of any one or more of Examples 21 through 28, wherein the gas scrubber assembly further includes: (i) a first intake valve fluidly connected between the manifold pipe and the first filter pipe, (ii) a third filter pipe fluidly connected between the manifold pipe and the filter discharge pipe, (iii) a third intake valve fluidly connected between the manifold pipe and the third filter pipe, and (iv) a first discharge valve fluidly connected between the first filter pipe and the filter discharge pipe, and wherein the first discharge valve is further fluidly connected between the third filter pipe and the filter discharge pipe.

EXAMPLE 30

The thermochemical energy conversion unit of Example 29, wherein the gas scrubber assembly further includes: (i) a second intake valve fluidly connected between the manifold pipe and the first filter pipe, (ii) a fourth filter pipe fluidly connected between the manifold pipe and the filter discharge pipe, (iii) a fourth intake valve fluidly connected between the manifold pipe and the fourth filter pipe, and (iv) a second discharge valve fluidly connected between the second filter pipe and the filter discharge pipe, and wherein the second discharge valve is further fluidly connected between the fourth filter pipe and the filter discharge pipe.

EXAMPLE 31

The thermochemical energy conversion unit of any one or more of Examples 21 through 30, wherein the gas scrubber assembly further includes at least one venturi riser fluidly connected inline between the reactor and the manifold pipe.

EXAMPLE 32

The thermochemical energy conversion unit of Example 31, wherein the gas scrubber assembly further includes at least one heat exchanger fluidly connected inline between the manifold pipe and the at least one venturi riser.

EXAMPLE 33

The thermochemical energy conversion unit of any one or more of Examples 31 through 32, wherein the at least one venturi riser includes a venturi pipe, and wherein the gas scrubber assembly is configured to be continuously fluidly connected from the venturi pipe to the filter discharge pipe for generating a continuous flow of the burnable gas therealong.

EXAMPLE 34

A thermochemical energy conversion assembly, comprising: (a) an intermodal transportation shipping container; and (b) the thermochemical energy conversion unit of any one or more of Examples 21 through 33, wherein the thermochemical energy conversion unit is received within the intermodal transportation shipping container.

EXAMPLE 35

A power system, comprising: (a) the thermochemical energy conversion assembly of Example 34; and (b) a power generation assembly operatively connected to the thermochemical energy conversion assembly, wherein the power generation assembly is configured to receive the burnable gas from the thermochemical energy conversion assembly and to generate electric power using the burnable gas.

EXAMPLE 36

A thermochemical energy conversion unit, comprising: (a) a heat expansion assembly having a reactor configured to receive a biomass and convert the biomass into a burnable gas and a biochar; (b) a biochar extraction assembly operatively connected to the heat expansion assembly and configured to receive the biochar therefrom; and (c) a gas scrubber assembly operatively connected to the heat expansion assembly and configured to receive the burnable gas therefrom, the gas scrubber assembly including: (i) at least one filter pipe, and (ii) at least one filter received within the at least one filter pipe, wherein the at least one filter includes the biochar received by the biochar extraction assembly from the heat expansion assembly.

EXAMPLE 37

The thermochemical energy conversion unit of Example 36, wherein the biochar extraction assembly includes a pelletizer for pelletizing the biochar received by the biochar extraction assembly from the heat expansion assembly, wherein the at least one filter includes the pelletized biochar.

EXAMPLE 38

A method of performing a thermochemical energy conversion using a heat expansion assembly having a reactor, and a gas scrubber assembly having (i) a manifold pipe, (ii) a filter discharge pipe, (iii) a first filter pipe configured to fluidly connect between the manifold pipe and the filter discharge pipe, (iv) a second filter pipe configured to fluidly connect between the manifold pipe and the filter discharge pipe, and (v) a plurality of valves fluidly connected between the manifold pipe and the filter discharge pipe, the method comprising: (a) delivering a biomass to the reactor; (b) converting the biomass into a burnable gas and a biochar via the reactor; (c) delivering the burnable gas to the manifold pipe; (d) closing, via the plurality of valves, at least one of the first and second filter pipes while maintaining at least one of the first and second filter pipes open; and (e) generating a continuous flow of the burnable gas from the manifold pipe to the filter discharge pipe.

EXAMPLE 39

The method of Example 38, further comprising directing the burnable gas through a filter of the at least one of the first and second filter pipes that is maintained open.

EXAMPLE 40

The method of Example 39, further comprising loading the filter with the biochar.

EXAMPLE 41

A thermochemical energy conversion unit, comprising: (a) a heat expansion assembly including: (i) a reactor configured to receive a biomass and convert the biomass into a burnable gas having undesirable materials therein and a biochar, and (ii) a heat expansion discharge pipe configured to discharge the burnable gas from the heat expansion assembly; and (b) a gas scrubber assembly operatively connected to the heat expansion assembly, the gas scrubber assembly including: (i) a first venturi riser fluidly connected to the heat expansion discharge pipe for receiving the burnable gas, the first venturi riser including a first venturi configured to increase a velocity of the burnable gas while decreasing the pressure of the burnable gas passing therethrough, (ii) a water distribution system including a first nozzle extending into the first venturi riser, wherein the first nozzle fluidly connects to the first venturi for introducing a fluid into the burnable gas and removing at least a portion of the undesirable materials therefrom, and (iii) a scrubber discharge pipe fluidly connected to the heat expansion discharge pipe such that the first venturi is fluidly connected therebetween, wherein the scrubber discharge pipe is configured to discharge the burnable gas after removing at least a portion of the undesirable materials therefrom.

EXAMPLE 42

The thermochemical energy conversion unit of Example 41, wherein the gas scrubber assembly further includes a second venturi riser fluidly connected to the first venturi riser in series for receiving the burnable gas, the second venturi riser including a second venturi configured to further increase the velocity of the burnable gas while further decreasing the pressure of the burnable gas passing therethrough.

EXAMPLE 43

The thermochemical energy conversion unit of Example 42, wherein the gas scrubber assembly further includes a third venturi riser fluidly connected to the second venturi riser in series for receiving the burnable gas, the third venturi riser including a third venturi configured to further increase the velocity of the burnable gas while further decreasing the pressure of the burnable gas passing therethrough.

EXAMPLE 44

The thermochemical energy conversion unit of any one or more of Examples 42 through 43, wherein the water distribution system further includes a second nozzle extending into the second venturi riser, wherein the second nozzle fluidly connects to the second venturi for introducing the fluid into the burnable gas and removing at least another portion of the undesirable materials therefrom.

EXAMPLE 45

The thermochemical energy conversion unit of any one or more of Examples 41 through 44, wherein the first nozzle extends into the first venturi riser such that the first nozzle is configured to introduce the fluid into the burnable gas at a predetermined angle.

EXAMPLE 46

The thermochemical energy conversion unit of any one or more of Examples 41 through 45, wherein the water distribution system further includes a reservoir configured to fluidly connect to the first venturi and collect the fluid after being introduced by the nozzle.

EXAMPLE 47

The thermochemical energy conversion unit of Example 46, wherein the water distribution system further includes a nozzle heat exchanger fluidly connected between the nozzle and the reservoir and configured to cool the fluid directed from the reservoir to the nozzle.

EXAMPLE 48

The thermochemical energy conversion unit of Example 47, wherein the heat exchanger includes a coil.

EXAMPLE 49

The thermochemical energy conversion unit of any one or more of Examples 46 through 48, further comprising a first heat exchanger fluidly connected between the first venturi riser and the scrubber discharge pipe, and wherein the first heat exchanger is further fluidly connected to the reservoir.

EXAMPLE 50

The thermochemical energy conversion unit of Example 49, wherein the first heat exchanger includes a first shell and tube heat exchanger.

EXAMPLE 51

The thermochemical energy conversion unit of any one or more of Examples 49 through 50, further comprising a second heat exchanger fluidly connected between the first heat exchanger and the scrubber discharge pipe, and wherein the second heat exchanger is further fluidly connected to the reservoir.

EXAMPLE 52

The thermochemical energy conversion unit of Example 51, wherein the second heat exchanger includes a first shell and tube heat exchanger.

EXAMPLE 53

The thermochemical energy conversion unit of any one or more of Examples 41 through 52, wherein the first venturi riser further includes a cooling jacket positioned about the first venturi and configured to cool the first venturi.

EXAMPLE 54

A thermochemical energy conversion assembly, comprising: (a) an intermodal transportation shipping container; and (b) the thermochemical energy conversion unit of any one or more of Examples 41 through 53, wherein the thermochemical energy conversion unit is received within the intermodal transportation shipping container.

EXAMPLE 55

A power system, comprising: (a) the thermochemical energy conversion assembly of Example 54; and (b) a power generation assembly operatively connected to the thermochemical energy conversion assembly, wherein the power generation assembly is configured to receive the burnable gas from the thermochemical energy conversion assembly and to generate electric power using the burnable gas.

EXAMPLE 56

A thermochemical energy conversion unit, comprising: (a) a heat expansion assembly including: (i) a reactor configured to receive a biomass and convert the biomass into a burnable gas having undesirable materials therein and a biochar, and (ii) a heat expansion discharge pipe configured to discharge the burnable gas from the heat expansion assembly; and (b) a gas scrubber assembly operatively connected to the heat expansion assembly, the gas scrubber assembly including: (i) at least one venturi riser fluidly connected to the heat expansion discharge pipe for receiving the burnable gas, the at least one venturi riser including: (A) at least one venturi configured to increase a velocity of the burnable gas while decreasing the pressure of the burnable gas passing therethrough, and (B) at least one cooling jacket positioned about the at least one venturi and configured to cool the at least one venturi; and (ii) a water distribution system including at least one nozzle extending into the at least one venturi riser, wherein the at least one nozzle fluidly connects to the at least one venturi for introducing a fluid into the burnable gas and removing at least a portion of the undesirable materials therefrom.

EXAMPLE 57

The thermochemical energy conversion unit of Example 56, wherein the at least one venturi riser includes first and second venturi risers including first and second venturis, respectively, and the at least one nozzle includes first and second nozzles extending into the first and second venturi risers, respectively, wherein the first nozzle is configured to introduce the fluid at a first spray angle and the second nozzle is configured to introduce the fluid at a second spray angle different from the first spray angle.

EXAMPLE 58

A method of performing a thermochemical energy conversion using a heat expansion assembly having (i) a reactor and (ii) a heat expansion discharge pipe, and a gas scrubber assembly having (i) at least one venturi riser including at least one venturi, (ii) a water distribution system including at least one nozzle extending into the at least one venturi riser, and (iii) a scrubber discharge pipe fluidly connected to the heat expansion discharge pipe such that the at least one venturi is fluidly connected therebetween, the method comprising: (a) delivering a biomass to the reactor; (b) converting the biomass into a burnable gas and a biochar via the reactor; (c) delivering the burnable gas to the at least one venturi riser via the heat expansion discharge pipe; (d) increasing a velocity of the burnable gas while decreasing a pressure of the burnable gas via the at least one venturi of the at least one venturi riser; (e) introducing a fluid into the burnable gas and removing at least a portion of the undesirable materials therefrom via the at least one nozzle; and (f) after removing at least a portion of the undesirable materials from the burnable gas, discharging the burnable gas via the scrubber discharge pipe.

EXAMPLE 59

The method of Example 58, further comprising circulating a cooling fluid to an external cooling jacket of the at least one venturi riser positioned about the at least one venturi to cool the burnable gases and thereby remove at least another portion of the undesirable materials via condensation.

EXAMPLE 60

The method of any one or more of Examples 58 through 59, wherein the at least one venturi riser includes first and second venturi risers including first and second venturis, respectively, and the at least one nozzle includes first and second nozzles extending into the first and second venturi risers, respectively, wherein the act of introducing a fluid into the burnable gas includes introducing the fluid via the first nozzle at a first spray angle and introducing the fluid via the second nozzle at a second spray angle different from the first spray angle.

EXAMPLE 61

A thermochemical energy conversion assembly, comprising: (a) a first intermodal transportation shipping container; and (b) a thermochemical energy conversion unit received within the first intermodal transportation shipping container, including: (i) a heat expansion assembly having a reactor configured to receive a biomass and convert the biomass into a burnable gas having undesirable materials therein and a biochar, and (ii) a gas scrubber assembly operatively connected to the heat expansion assembly and configured to receive the burnable gas therefrom and remove the undesirable materials from the burnable gas and discharge the burnable gas therefrom, wherein the first intermodal transportation shipping container with the thermochemical energy conversion unit received therein is configured to be transported from a first location to a second location remote from the first location.

EXAMPLE 62

The thermochemical energy conversion assembly of Example 61, wherein the first intermodal transportation shipping container has a length of about 20 ft.

EXAMPLE 63

The thermochemical energy conversion assembly of any one or more of Examples 61 through 62, wherein the first intermodal transportation shipping container has a width of about 8 ft.

EXAMPLE 64

The thermochemical energy conversion assembly of any one or more of Examples 61 through 63, wherein the first intermodal transportation shipping container has a height of about 8.5 ft.

EXAMPLE 65

The thermochemical energy conversion assembly of any one or more of Examples 61 through 64, wherein the first intermodal transportation shipping container includes at least one door configured to selectively move between an opened door position for accessing the thermochemical energy conversion unit therethrough and a closed door position for inhibiting access to the thermochemical energy conversion unit.

EXAMPLE 66

The thermochemical energy conversion assembly of any one or more of Examples 61 through 65, wherein the reactor includes: (A) a shell, and (B) a conveyor disposed within the shell and configured to convey the biomass through the shell.

EXAMPLE 67

The thermochemical energy conversion assembly of Example 66, wherein the conveyor includes an auger.

EXAMPLE 68

The thermochemical energy conversion assembly of any one or more of Examples 66 through 67, wherein the reactor further includes at least one induction heater positioned about the shell and configured to inductively heat each of the shell and the conveyor for converting the biomass into the burnable gas and the biochar.

EXAMPLE 69

The thermochemical energy conversion assembly of any one or more of Examples 61 through 68, wherein the thermochemical energy conversion unit further includes a biochar extraction assembly operatively connected to the heat expansion assembly and configured to receive the biochar therefrom.

EXAMPLE 70

The thermochemical energy conversion assembly of any one or more of Examples 61 through 69, wherein the thermochemical energy conversion unit further includes a biomass feeding assembly operatively connected to the heat expansion assembly and configured to feed the biomass thereto.

EXAMPLE 71

A power system, comprising: (a) the thermochemical energy conversion assembly of any one or more of Examples 61 through 70; and (b) a power generation assembly configured to be operatively connected to the thermochemical energy conversion assembly, wherein the power generation assembly comprises: (i) a second intermodal transportation shipping container, and (ii) a power generation unit received within the second intermodal transportation shipping container, wherein the power generation unit is configured to receive the burnable gas from the thermochemical energy conversion assembly and to generate electric power using the burnable gas, wherein the second intermodal transportation shipping container with the power generation unit received therein is configured to be transported from the first location to the second location.

EXAMPLE 72

The power system of Example 71, wherein the second intermodal transportation shipping container has a length of about 20 ft.

EXAMPLE 73

The power system of any one or more of Examples 71 through 72, wherein the second intermodal transportation shipping container has a width of about 8 ft.

EXAMPLE 74

The power system of any one or more of Examples 71 through 73, wherein the second intermodal transportation shipping container has a height of about 8.5 ft.

EXAMPLE 75

The power system of any one or more of Examples 71 through 74, wherein the second intermodal transportation shipping container includes at least one door configured to selectively move between an opened door position for accessing the thermochemical energy conversion unit therethrough and a closed door position for inhibiting access to the thermochemical energy conversion unit.

EXAMPLE 76

A method of moving a thermochemical energy conversion unit, the thermochemical energy conversion unit including a heat expansion assembly and a gas scrubber assembly, wherein the heat expansion assembly has a reactor configured to receive a biomass and convert the biomass into a burnable gas having undesirable materials therein and a biochar, wherein the gas scrubber assembly is operatively connected to the heat expansion assembly and configured to receive the burnable gas therefrom and remove the undesirable materials from the burnable gas and discharge the burnable gas therefrom, the method comprising: (a) positioning the thermochemical energy conversion unit within an intermodal transportation shipping container; and (b) moving the intermodal transportation shipping container with the thermochemical energy conversion unit therein from a first location to a second location remote from the first location.

EXAMPLE 77

The method of Example 76, further comprising loading the intermodal transportation shipping container with the thermochemical energy conversion unit therein onto at least one of a railcar, a cargo ship, an aircraft, or a truck prior to the act of moving.

EXAMPLE 78

The method of Example 77, wherein the act of moving includes moving the intermodal transportation shipping container with the thermochemical energy conversion unit therein from the first location to the second location via the at least one of a railcar, a cargo ship, an aircraft, or a truck.

EXAMPLE 79

The method of any one or more of Examples 76 through 78, wherein the intermodal transportation shipping container further includes at least one door, the method further comprising closing the at least one door from an opened position to a closed position before moving the intermodal transportation shipping container with the thermochemical energy conversion unit therein from the first location to the second location.

EXAMPLE 80

The method of Example 79, further comprising opening the at least one door from the closed position to the opened position after moving the intermodal transportation shipping container with the thermochemical energy conversion unit therein from the first location to the second location.

EXAMPLE 81

An apparatus, comprising: (a) a container; and (b) a thermochemical energy conversion unit housed within the container comprising: (i) a biomass feeding assembly, (ii) a heat expansion assembly operatively connected to the biomass feeding assembly, (iii) a gas scrubber assembly operatively connected to the heat expansion assembly, and (iv) a biochar extraction assembly operatively connected to the gas scrubber assembly, wherein the biomass feeding assembly is configured to accept a biomass and move the biomass to the heat expansion assembly, wherein the heat expansion assembly is configured to separate a burnable gas from a biochar, wherein the gas scrubber assembly is configured to accept the burnable gas from the heat expansion assembly and remove undesirable materials and render the burnable gas as a purer burnable gas, and wherein the biochar extraction assembly is configured to remove the biochar from the thermochemical energy conversion unit.

EXAMPLE 82

An apparatus, comprising: (a) a biomass feeding assembly; (b) a heat expansion assembly operatively connected to the biomass feeding assembly configured to heat a biomass; (c) a gas scrubber assembly operatively connected to the heat expansion assembly configured to remove undesirable materials from a burnable gas; and (d) a biochar extraction assembly operatively connected to the gas scrubber assembly, wherein the biochar extraction assembly is configured to remove a biochar within an oxygen deprived environment and includes a cooling jacket configured to cool the biochar before being released to an oxygen rich environment.

EXAMPLE 83

A method of separating a biomass with a thermochemical energy conversion unit including a biomass feeding assembly, a heat expansion assembly operatively connected to the biomass feeding assembly, a gas scrubber assembly operatively connected to the heat expansion assembly, and a biochar extraction assembly operatively connected to the gas scrubber assembly, the method comprising: (a) heating the biomass in the heat expansion assembly to release a burnable gas from a biochar; (b) separating the biochar from the burnable gas with centripetal force; (c) delivering the burnable gas to the gas scrubber assembly and the biochar to the biochar extraction assembly; (d) removing undesirable materials from the burnable gas with the gas scrubber assembly; and (e) providing the burnable gas at a first outlet of the thermochemical energy conversion unit, and the biochar at a second outlet of the thermochemical energy conversion unit.

IV. Miscellaneous

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:
1. A thermochemical energy conversion unit, comprising:
 (a) a heat expansion assembly including:
  (i) a reactor configured to receive a biomass and convert the biomass into a burnable gas having undesirable materials therein and a biochar, wherein the reactor includes:
   (A) a shell, and
   (B) a conveyor disposed within the shell and configured to convey the biomass through the shell,
  (ii) a heat expansion discharge pipe configured to discharge the burnable gas from the heat expansion assembly, and
  (iii) a fluid circuit configured to transfer thermal energy between a fluid and at least one segment of the shell; and
 (b) a gas scrubber assembly operatively connected to the heat expansion assembly and configured to receive the burnable gas therefrom and to remove the undesirable materials from the burnable gas, wherein the gas scrubber assembly includes a scrubber discharge pipe configured to discharge the burnable gas from the gas scrubber assembly,
 wherein the heat expansion assembly and the gas scrubber assembly are configured to be continuously fluidly connected from the heat expansion discharge pipe to the scrubber discharge pipe for generating a continuous flow of the burnable gas therealong.

2. The thermochemical energy conversion unit of claim 1, wherein the conveyor includes an auger.

3. The thermochemical energy conversion unit of claim 1, wherein the reactor further includes at least one induction heater positioned about the shell and configured to inductively heat each of the shell and the conveyor for converting the biomass into the burnable gas and the biochar.

4. The thermochemical energy conversion unit of claim 3, wherein the at least one induction heater includes a plurality of induction heaters positioned about respective segments of the shell.

5. The thermochemical energy conversion unit of claim 3, wherein the at least one segment of the shell is upstream of the at least one induction heater.

6. The thermochemical energy conversion unit of claim 3, wherein the at least one segment of the shell is downstream of the at least one induction heater.

7. The thermochemical energy conversion unit of claim 1, wherein the heat expansion assembly further includes at least one separator configured to separate the burnable gas and the biochar from each other.

8. The thermochemical energy conversion unit of claim 7, wherein the at least one separator includes at least one of a cyclone separator or a Thien baffle separator.

9. The thermochemical energy conversion unit of claim 1, further comprising a biochar extraction assembly operatively connected to the heat expansion assembly and configured to receive the biochar therefrom, wherein the biochar extraction assembly includes:
  (i) a biochar extraction assembly shell, and
  (ii) a conveyor disposed within the biochar extraction assembly shell and configured to convey the biochar through the biochar extraction assembly shell.

10. The thermochemical energy conversion unit of claim 9, wherein the biochar extraction assembly further includes a fluid circuit configured to transfer thermal energy between a fluid and at least one segment of the biochar extraction assembly shell.

11. The thermochemical energy conversion unit of claim 1, further comprising a biomass feeding assembly operatively connected to the heat expansion assembly and configured to feed the biomass thereto, wherein the biomass feeding assembly is configured to control a particle size of the biomass.

12. A thermochemical energy conversion assembly, comprising:
  (a) an intermodal transportation shipping container; and
  (b) the thermochemical energy conversion unit of claim 1, wherein the thermochemical energy conversion unit is received within the intermodal transportation shipping container.

13. A power system, comprising:
  (a) the thermochemical energy conversion assembly of claim 12; and
  (b) a power generation assembly operatively connected to the thermochemical energy conversion assembly, wherein the power generation assembly is configured to receive the burnable gas from the thermochemical energy conversion assembly and to generate electric power using the burnable gas.

14. The thermochemical energy conversion unit of claim 1, wherein the fluid circuit is configured to transfer thermal energy from the fluid to the at least one segment of the shell.

15. The thermochemical energy conversion unit of claim 1, wherein the fluid circuit is configured to transfer thermal energy to the fluid from the at least one segment of the shell.

16. The thermochemical energy conversion unit of claim 1, wherein the at least one segment of the shell includes a first segment of the shell and a second segment of the shell, wherein the fluid circuit is configured to transfer thermal energy from the fluid to the first segment of the shell, and wherein the fluid circuit is configured to transfer thermal energy to the fluid from the second segment of the shell.

17. The thermochemical energy conversion unit of claim 1, wherein the fluid circuit includes a heat exchanger configured to adjust a temperature of the fluid.

18. The thermochemical energy conversion unit of claim 17, wherein the at least one segment of the shell includes a first segment of the shell and a second segment of the shell, wherein the heat exchanger is positioned between the first segment of the shell and the second segment of the shell.

19. A thermochemical energy conversion unit, comprising:
  (a) a heat expansion assembly including:
    (i) a reactor configured to receive a biomass and convert the biomass into a burnable gas having undesirable materials therein and a biochar, wherein the reactor includes:
      (A) a shell for directing the biomass therethrough, and
      (B) at least one induction heater positioned about the shell and configured to inductively heat the shell for converting the biomass into the burnable gas and the biochar,
    (ii) a heat expansion discharge pipe configured to discharge the burnable gas from the heat expansion assembly, and
    (iii) a fluid circuit configured to transfer thermal energy from a fluid to a first segment of the shell upstream of the at least one induction heater, wherein the fluid circuit is configured to transfer thermal energy to the fluid from a second segment of the shell downstream of the at least one induction heater; and
  (b) a gas scrubber assembly operatively connected to the heat expansion assembly and configured to receive the burnable gas therefrom and to remove the undesirable materials from the burnable gas, wherein the gas scrubber assembly includes a scrubber discharge pipe configured to discharge the burnable gas from the gas scrubber assembly,
  wherein the heat expansion assembly and the gas scrubber assembly are configured to be continuously fluidly connected from the heat expansion discharge pipe to the scrubber discharge pipe for generating a continuous flow of the burnable gas therealong.

20. A thermochemical energy conversion unit, comprising:
  (a) a heat expansion assembly including:
    (i) a reactor configured to receive a biomass and convert the biomass into a burnable gas having undesirable materials therein and a biochar, wherein the reactor includes a shell for directing the biomass therethrough,
    (ii) a heat expansion discharge pipe configured to discharge the burnable gas from the heat expansion assembly, and
    (iii) a fluid circuit configured to transfer thermal energy between a fluid and at least one segment of the shell, wherein the fluid circuit includes:

(A) a pump configured to circulate the fluid, and
(B) a heat exchanger configured to adjust a temperature of the fluid; and (b) a gas scrubber assembly operatively connected to the heat expansion assembly and configured to receive the burnable gas therefrom and to remove the undesirable materials from the burnable gas, wherein the gas scrubber assembly includes a scrubber discharge pipe configured to discharge the burnable gas from the gas scrubber assembly, wherein the heat expansion assembly and the gas scrubber assembly are configured to be continuously fluidly connected from the heat expansion discharge pipe to the scrubber discharge pipe for generating a continuous flow of the burnable gas therealong.

* * * * *